(12) United States Patent
Inoue et al.

(10) Patent No.: US 10,677,186 B2
(45) Date of Patent: Jun. 9, 2020

(54) CONTROL APPARATUS FOR COMPRESSION AUTO-IGNITION ENGINE

(71) Applicant: Mazda Motor Corporation, Aki-gun. Hiroshima (JP)

(72) Inventors: Atsushi Inoue, Aki-gun (JP); Masanari Sueoka, Hiroshima (JP); Kota Matsumoto, Aki-gun (JP); Tomonori Urushihara, Yokohama (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/087,536

(22) PCT Filed: Nov. 10, 2017

(86) PCT No.: PCT/JP2017/040546
§ 371 (c)(1),
(2) Date: Sep. 21, 2018

(87) PCT Pub. No.: WO2018/096947
PCT Pub. Date: May 31, 2018

(65) Prior Publication Data
US 2019/0309699 A1    Oct. 10, 2019

(30) Foreign Application Priority Data

Nov. 22, 2016    (JP) .................... 2016-226929

(51) Int. Cl.
*F02D 41/30* (2006.01)
*F02P 9/00* (2006.01)
(Continued)

(52) U.S. Cl.
CPC .......... *F02D 41/3041* (2013.01); *F02B 23/10* (2013.01); *F02D 35/023* (2013.01);
(Continued)

(58) Field of Classification Search
CPC ............ F02D 41/3041; F02D 41/0007; F02D 35/023; F02D 2200/024; F02P 5/15;
(Continued)

(56) References Cited

U.S. PATENT DOCUMENTS 3,908,371 A * 9/1975 Nagai ................ B01D 53/9477
  60/301
4,325,346 A * 4/1982 Yokoyama .............. F02B 31/08
  123/184.39

(Continued)

FOREIGN PATENT DOCUMENTS

EP    3418538 A1    12/2018
EP    3421766 A1    1/2019
(Continued)

OTHER PUBLICATIONS

Olesky, L,"An Experimental Investigation of the Burn Rates of Naturally Aspirated Spark Assisted Compression Ignition Combustion in a Single Cylinder Engine with Negative Valve Overlap," Dissertation, University of Michigan, 2013, 173 pages.
(Continued)

*Primary Examiner* — Hung Q Nguyen
*Assistant Examiner* — Brian R Kirby
(74) *Attorney, Agent, or Firm* — Alleman Hall Creasman & Tuttle LLP

(57) ABSTRACT

A control apparatus for a compression autoignition engine includes an engine, a spark plug, a controller, and sensors. After the spark plug ignites air-fuel mixture to start combustion, unburned air-fuel mixture is combusted by autoignition. The controller changes an SI rate in accordance with an operation state of the engine. Furthermore, the controller adjusts the SI rate when determining that the SI rate needs to be adjusted.

11 Claims, 14 Drawing Sheets

(51) Int. Cl.
*F02D 35/02* (2006.01)
*F02B 23/10* (2006.01)
*F02P 5/15* (2006.01)
*F02D 41/00* (2006.01)

(52) U.S. Cl.
CPC ............ *F02D 41/0007* (2013.01); *F02P 5/15* (2013.01); *F02P 9/00* (2013.01); *F02D 2200/024* (2013.01); *Y02T 10/125* (2013.01); *Y02T 10/46* (2013.01)

(58) Field of Classification Search
CPC ........... F02P 9/00; F02B 23/10; Y02T 10/125; Y02T 10/46
USPC ....................................................... 123/435
See application file for complete search history.

(56) References Cited

U.S. PATENT DOCUMENTS

| | | | |
|---|---|---|---|
| 5,727,528 A * | 3/1998 | Hori | F02D 41/0072 123/486 |
| 6,073,610 A * | 6/2000 | Matsumoto | F02D 11/107 123/396 |
| 6,530,361 B1 * | 3/2003 | Shiraishi | F02B 1/12 123/305 |
| 7,168,420 B1 * | 1/2007 | Yang | F02D 41/003 123/295 |
| 7,231,906 B1 * | 6/2007 | Haskara | F02D 35/028 123/435 |
| 7,252,069 B2 * | 8/2007 | Date | F02D 41/3041 123/299 |
| 8,887,700 B2 * | 11/2014 | Kakuda | F02D 41/0072 123/568.11 |
| 9,382,834 B2 * | 7/2016 | Dieler | F02D 41/3041 |
| 2002/0023431 A1 * | 2/2002 | Takemura | F02D 37/02 60/284 |
| 2002/0059914 A1 * | 5/2002 | Yamaguchi | F02D 37/02 123/299 |
| 2002/0129798 A1 * | 9/2002 | Urushihara | F02B 47/08 123/568.13 |
| 2002/0195078 A1 * | 12/2002 | Hasegawa | F01L 1/34 123/294 |
| 2005/0016496 A1 | 1/2005 | Hitomi et al. | |
| 2006/0070913 A1 * | 4/2006 | Haase | C10L 1/04 208/15 |
| 2008/0127952 A1 * | 6/2008 | Hatamura | F01N 13/107 123/568.11 |
| 2011/0180035 A1 * | 7/2011 | Durrett | F02B 17/005 123/295 |
| 2011/0219746 A1 * | 9/2011 | Yezerets | F01N 3/035 60/274 |
| 2012/0118275 A1 * | 5/2012 | Kang | F02D 41/0062 123/568.11 |
| 2012/0167858 A1 * | 7/2012 | Kakuda | F02D 41/0072 123/27 R |
| 2012/0216776 A1 * | 8/2012 | Nagatsu | F02B 23/101 123/305 |
| 2013/0125544 A1 * | 5/2013 | Mond | F02D 23/00 60/611 |
| 2013/0284146 A1 * | 10/2013 | Tsujita | F02D 11/00 123/297 |
| 2014/0216396 A1 * | 8/2014 | Yamashita | F02B 11/00 123/297 |
| 2014/0283800 A1 * | 9/2014 | Hellstrom | F02D 41/0062 123/568.14 |
| 2014/0331959 A1 * | 11/2014 | Doran | F02B 11/00 123/27 R |
| 2014/0352298 A1 * | 12/2014 | Nogawa | F02D 41/1475 60/605.2 |
| 2015/0218994 A1 * | 8/2015 | Nogawa | F02D 41/0275 60/285 |
| 2015/0369178 A1 * | 12/2015 | Asai | F02D 41/0025 123/3 |
| 2016/0186681 A1 * | 6/2016 | Ravi | F02D 41/3041 701/115 |
| 2017/0292462 A1 * | 10/2017 | Tsuda | F02B 11/00 |

FOREIGN PATENT DOCUMENTS

| | | |
|---|---|---|
| JP | 2003049691 A | 2/2003 |
| JP | 2003254105 A | 9/2003 |
| JP | 4082292 B2 | 4/2008 |
| JP | 2009108777 A | 5/2009 |
| JP | 2010090794 A | 4/2010 |
| JP | 2012241592 A | 12/2012 |
| JP | 2012246783 A | 12/2012 |

OTHER PUBLICATIONS

Manofsky, et al., "Bridging the Gap between HCCI and SI: Spark-Assisted Compression Ignition," SAE Technical Paper, Apr. 12, 2011, 18 pages.

Wang, Zhi et al., "Combustion visualization and experimental study on spark induced compression ignition (SICI) in gasoline HCCI engines," Energy Conversion and Management, No. 51, Jan. 6, 2010, 10 pages.

\* cited by examiner

CONTROL APPARATUS FOR COMPRESSION AUTO-IGNITION ENGINE

TECHNICAL FIELD

The present disclosure relates to a control apparatus for a compression autoignition engine.

BACKGROUND ART

Patent Document 1 discloses an engine which combusts air-fuel mixture in a combustion chamber by autoignition in a partial load region. This engine promotes autoignition of air-fuel mixture by leaving hot burned gas in the combustion chamber in an operation region on a low load side in the partial load region. Furthermore, in the engine, in an operation region on a high load side in the partial load region, cooled burned gas is introduced into the combustion chamber such that autoignition is less likely to occur, and a spark plug performs ignition immediately before the compression top dead center.

CITATION LIST

Patent Document

PATENT DOCUMENT 1: Japanese Patent No. 4082292

SUMMARY OF THE INVENTION

Technical Problem

In combustion by compression ignition, when an amount of fuel to be supplied to the combustion chamber is increased, pressure variation at ignition becomes large, resulting in combustion noise being increased. Therefore, combustion by compression ignition can be performed only when the operation state of the engine is in a narrow operation region corresponding to a part of a total operation region of the engine. If combustion by compression ignition can be performed over a wide operation region, fuel economy performance of the engine can be greatly enhanced.

In view of the foregoing background, it is therefore an object of the present disclosure to expand an operation region where combustion by compression ignition is performed, while inhibiting generation of combustion noise in a compression autoignition engine.

Solution to the Problem

The inventors of the present invention have found a combustion mode in which SI (Spark Ignition) combustion and CI (Compression Ignition) combustion are combined. That is, air-fuel mixture in a combustion chamber is forcibly ignited to perform combustion by flame propagation, and unburned air-fuel mixture in the combustion chamber is combusted by autoignition due to heat generated by the SI combustion. Since the combustion by flame propagation has a relatively low combustion speed, generation of combustion noise can be inhibited. In addition, the CI combustion shortens the combustion period as compared to the combustion by flame propagation, whereby fuel economy is advantageously improved. Therefore, the combustion mode in which the SI combustion and the CI combustion are combined can improve fuel economy while inhibiting generation of combustion noise. In this combustion mode, the CI combustion is controlled by the SI combustion. Therefore, the combustion mode is hereinafter referred to as SPCCI (SPark Controlled Compression Ignition) combustion.

The inventors of the present invention have found that both inhibition of generation of combustion noise and improvement of fuel economy can be achieved over a wide operation region by changing, according to the operation state of the engine, the SI rate that is an index associated with a ratio of an amount of heat generated when the air-fuel mixture in the combustion chamber is combusted by flame propagation, to a total amount of heat generated when the air-fuel mixture is combusted, in the SPCCI combustion. The disclosed technique has been completed based on the finding.

Specifically, the technique disclosed herein relates to a control apparatus for a compression autoignition engine. The control apparatus for the compression autoignition engine includes: an engine configured to cause autoignition of air-fuel mixture in a combustion chamber; a spark plug disposed so as to face an inside of the combustion chamber, the spark plug being configured to ignite the air-fuel mixture in the combustion chamber; a controller connected to the spark plug, the controller being configured to operate the engine by outputting a control signal to the spark plug; and a sensor connected to the controller, the sensor being configured to detect a parameter relating to an operation state of the engine, and output a detection signal to the controller.

After the spark plug ignites the air-fuel mixture to start combustion, unburned air-fuel mixture is combusted by autoignition. The controller changes an SI rate in accordance with the operation state of the engine based on the detection signal from the sensor. The SI rate is an index associated with a ratio of an amount of heat generated when the air-fuel mixture in the combustion chamber is combusted by flame propagation, to a total amount of heat generated when the air-fuel mixture is combusted. Furthermore, the controller adjusts the SI rate when determining that the SI rate needs to be adjusted, upon receiving the detection signal from the sensor.

The "combustion chamber" described herein is not limited to a space formed when a piston reaches the compression top dead center. The term "combustion chamber" is used to encompass a broader meaning.

In this configuration, upon receiving a control signal from the controller, the spark plug forcibly ignites air-fuel mixture in the combustion chamber. After combustion of the air-fuel mixture starts, unburned air-fuel mixture in the combustion chamber is combusted by autoignition, thereby completing combustion.

The controller changes the SI rate according to the operation state of the engine. In the combustion mode in which air-fuel mixture is combusted by flame propagation and thereafter unburned air-fuel mixture is combusted by autoignition to complete combustion, that is, in the SPCCI combustion, the SI rate is less than 100%.

When the SI rate is increased in the SPCCI combustion, the proportion of the SI combustion becomes great, so that combustion noise is advantageously inhibited. When the SI rate is reduced in the SPCCI combustion, the proportion of the CI combustion becomes great, so that fuel economy is advantageously improved.

When the SI rate is changed according to the operation state of the engine, an operation region where the SPCCI combustion is performed can be expanded while suppressing generation of combustion noise. Thus, fuel economy performance of the engine is improved.

The controller adjusts the SI rate when determining that the SI rate needs to be adjusted. Therefore, the SPCCI combustion in the combustion chamber can be set in a target combustion state corresponding to the operation state of the engine. As a result, the operation region where the SPCCI combustion is performed can be expanded while inhibiting combustion noise.

The control apparatus for the compression autoignition engine may include: a state quantity setting device mounted to the engine, the state quantity setting device being configured to set the inside of the combustion chamber in a desired state by adjusting introduction of fresh air and burned gas into the combustion chamber; and an injector mounted to the engine, the injector being configured to inject fuel into the combustion chamber.

The controller may set a target SI rate based on the operation state of the engine, and output control signals to the state quantity setting device, the injector, and the spark plug so that combustion at the target SI rate is performed.

Thus, the SPCCI combustion in the combustion chamber can be set in the target combustion state corresponding to the operation state of the engine.

The sensor may include a pressure sensor configured to detect a pressure inside the combustion chamber, and the controller may receive a detection signal from the pressure sensor, calculate the SI rate based on a pressure waveform caused by combustion of the air-fuel mixture, and adjust the SI rate when the calculated SI rate deviates from the target SI rate.

Thus, the SI rate can be adjusted according to deviation between the target combustion state, and the actual combustion state in the combustion chamber based on the detection signal from the pressure sensor. The SPCCI combustion in the combustion chamber can be accurately set in the target combustion state.

The controller may adjust introduction of fresh air and burned gas into the combustion chamber by the control signal outputted to the state quantity setting device, so as to adjust the SI rate.

Since the state quantity setting device adjusts introduction of fresh air and burned gas into the combustion chamber, the temperature in the combustion chamber before start of compression is adjusted. When the temperature before start of compression changes, timing of autoignition changes and the amount of heat generated due to the SI combustion changes in the SPCCI combustion. That is, the SI rate can be adjusted by adjusting introduction of fresh air and burned gas.

The controller may predict a state quantity in the combustion chamber, based on the detection signal from the sensor. When the controller determines, based on the predicted state quantity, that an SI rate of combustion to be performed will deviate from the target SI rate, the controller may adjust the SI rate so that the SI rate approaches the target SI rate.

By adjusting the SI rate based on the predicted state quantity, SPCCI combustion to be performed can be set in the target combustion state.

The controller may adjust ignition timing by the control signal outputted to the spark plug so that the SI rate approaches the target SI rate.

When the temperature in the combustion chamber is low, timing of autoignition is delayed in the SPCCI combustion. Therefore, when the ignition timing is advanced, an amount of heat generated by the SI combustion is increased according to start of the SI combustion becoming earlier, whereby timing of autoignition can be prevented from being delayed.

On the other hand, when the temperature in the combustion chamber is high, timing of autoignition is advanced in the SPCCI combustion. Therefore, when the ignition timing is retarded, heat generation due to the SI combustion is suppressed according to start of the SI combustion being delayed, whereby timing of autoignition is prevented from being advanced.

Therefore, by adjusting the ignition timing, the SI rate in the SPCCI combustion can be adjusted. In particular, adjustment of the ignition timing has high responsiveness to adjusting the SI rate.

The controller may adjust fuel injection timing by the control signal outputted to the injector so as to correspond to the adjustment of the ignition timing.

By adjusting the fuel injection timing, appropriate air-fuel mixture can be formed in the combustion chamber at the ignition timing. The spark plug can assuredly ignite the air-fuel mixture, and autoignition of unburned air-fuel mixture can be performed at appropriate timing.

The injector may receive the control signal from the controller, and execute: succeeding injection in which fuel is injected at timing before ignition timing and close to the ignition timing; and preceding injection in which fuel is injected at timing before the succeeding injection and not close to the ignition timing, so as to form an almost homogeneous air-fuel mixture in the combustion chamber.

Fuel injected by the preceding injection is combusted mainly by CI combustion, and fuel injected by the succeeding injection is combusted mainly by SI combustion. In the SPCCI combustion, stabilization of ignition by the spark plug, stabilization of combustion by flame propagation, and stabilization of ignition by autoignition, are achieved. In addition, since the air-fuel mixture formed in the combustion chamber is almost homogeneous, improvement of fuel economy by reduction of unburned fuel loss and improvement of exhaust gas performance by avoiding generation of smoke, can be achieved.

The controller may output control signals to the state quantity setting device and the injector, to set the inside of the combustion chamber in a state where a G/F that represents an index associated with a mass ratio between total gas in the combustion chamber, and fuel is in a range from 18.5 to 30, and an excess air ratio $\lambda$ is $1.0\pm0.2$.

In the SPCCI combustion in which the SI combustion and the CI combustion are combined, timing of autoignition can be accurately controlled. That is, even when variation in temperature occurs in the combustion chamber before start of compression, the variation in temperature before start of compression can be absorbed by adjusting an amount of heat generated by the SI combustion. When the start timing of the SI combustion is adjusted by, for example, adjustment of ignition timing, according to the temperature in the combustion chamber before start of compression, autoignition of unburned air-fuel mixture can be performed at target timing.

However, in the SPCCI combustion, in order to accurately control the timing of autoignition, the timing of autoignition needs to change according to the ignition timing being changed. Sensitivity for change of timing of autoignition with respect to change of ignition timing is preferably high.

The inventors of the present invention have found through study that, when the state inside the combustion chamber is set such that $\lambda$ of air-fuel mixture is $1.0\pm0.2$ and a G/F of the air-fuel mixture is in a range from 18.5 to 30, the SI combustion is stabilized and therefore timing of autoignition changes with respect to change of ignition timing. That is, in the SPCCI combustion, timing of autoignition can be accurately controlled.

When the state inside the combustion chamber satisfies 18.5<G/F, a dilution rate of the air-fuel mixture is great, whereby fuel economy performance of the engine is enhanced.

Moreover, when λ is set to 1.0±0.2, exhaust gas can be purified by the three-way catalyst mounted in an exhaust passage of the engine.

According to the above-described configuration, timing of autoignition can be accurately controlled in the SPCCI combustion in which the SI combustion and the CI combustion are combined, while achieving high fuel economy performance and good exhaust gas performance.

Since timing of autoignition is controlled by the SI combustion, even if the temperature in the combustion chamber varies before start of compression, autoignition of unburned air-fuel mixture can be performed at timing optimal for fuel economy while inhibiting combustion noise.

Advantages of the Invention

As described above, according to the control apparatus for the compression autoignition engine, since the SI rate is changed in accordance with the operation state of the engine, the operation region where combustion by compression ignition is performed can be expanded while inhibiting generation of combustion noise, thereby improving fuel economy performance of the engine.

DESCRIPTION OF EMBODIMENTS

Figure 1:
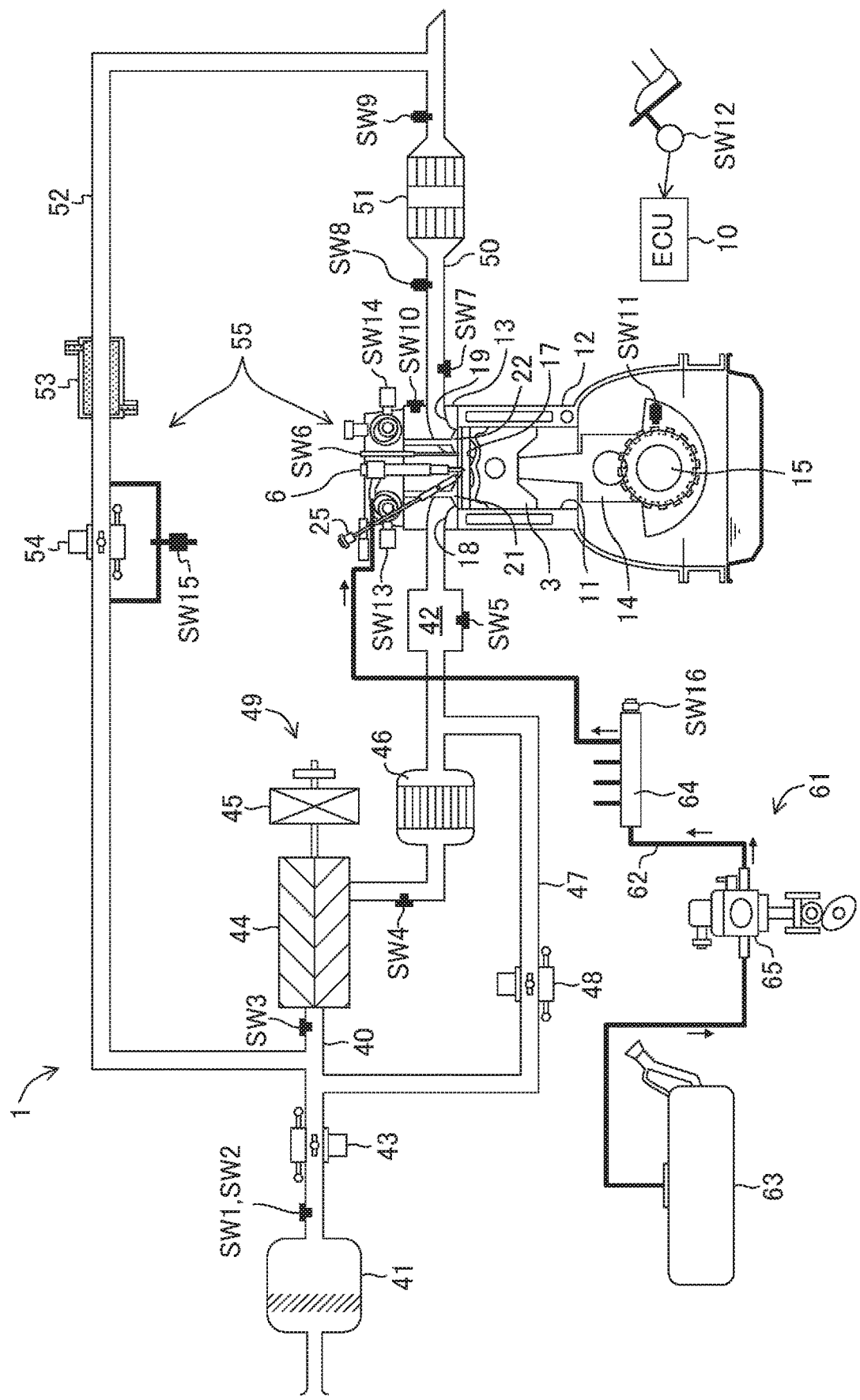
FIG. 1 illustrates a configuration of a compression autoignition engine.
Figure 2:
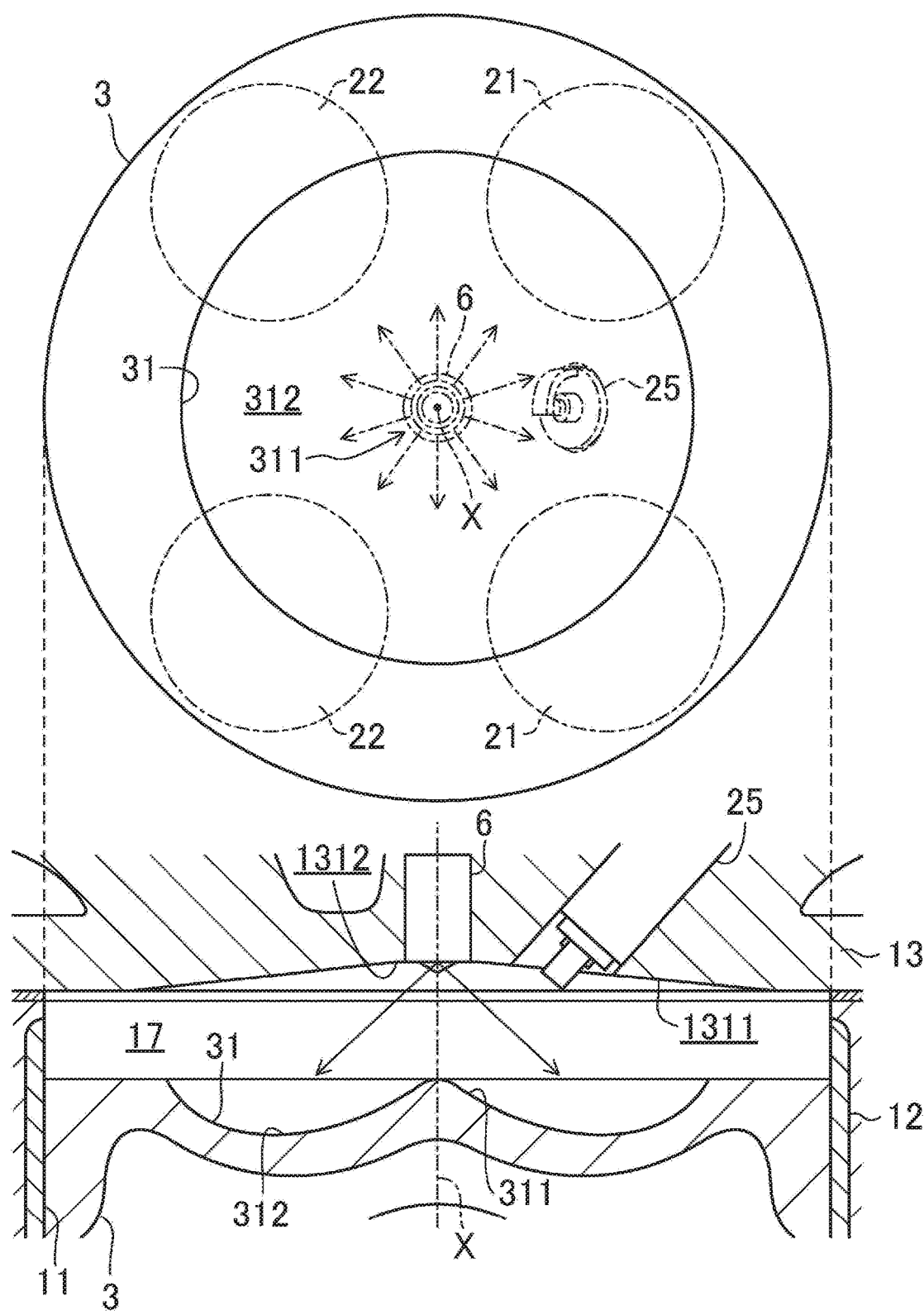
FIG. 2 is a cross-sectional view of a configuration of a combustion chamber.
Figure 3:
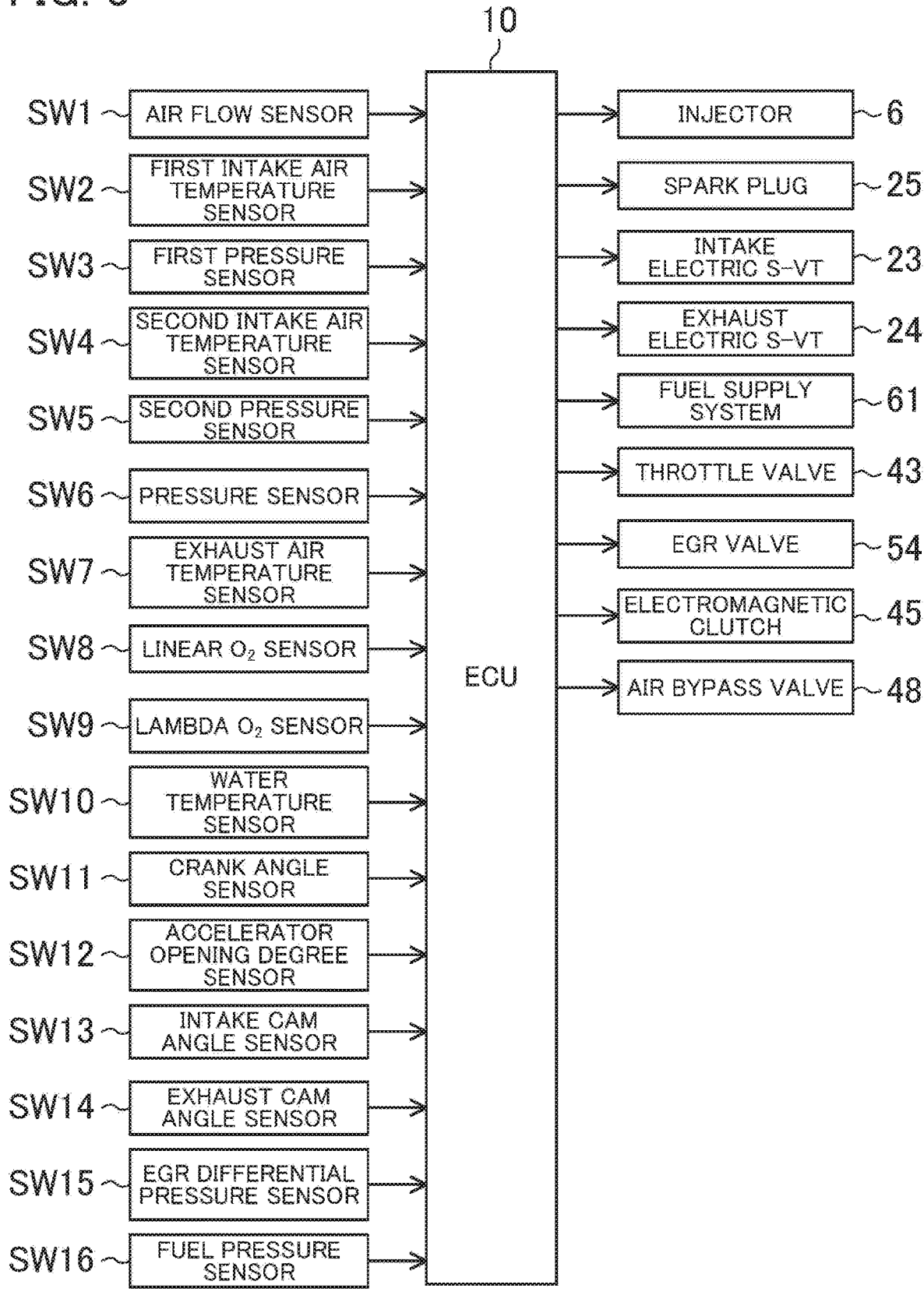
FIG. 3 is a block diagram illustrating a configuration of a control apparatus for the compression autoignition engine.

Hereinafter, embodiments of a control apparatus for a compression autoignition engine will be described in detail with reference to the drawings. Described below is an example of the control apparatus for the compression autoignition engine. FIG. 1 illustrates a configuration of the compression autoignition engine. FIG. 2 is a cross-sectional view of a configuration of a combustion chamber. In FIG. 1, the intake side is the left side on the drawing sheet, and the exhaust side is the right side on the drawing sheet. In FIG. 2, the intake side is the right side on the drawing sheet, and the exhaust side is the left side on the drawing sheet. FIG. 3 is a block diagram illustrating a configuration of the control apparatus for the compression autoignition engine.

An engine 1 is mounted to a four-wheeled automobile. By operation of the engine 1, the automobile runs. Fuel for the engine 1 is gasoline in this exemplary configuration. The fuel may be gasoline that contains bioethanol or the like. The fuel for the engine 1 may be any fuel when the fuel is liquid fuel that contains at least gasoline.

(Configuration of Engine)

The engine 1 includes a cylinder block 12 and a cylinder head 13 placed thereon. A plurality of cylinders 11 are formed in the cylinder block 12. In FIG. 1 and FIG. 2, one cylinder 11 is merely illustrated. The engine 1 is a multi-cylinder engine.

In each of the cylinders 11, a piston 3 is slidably inserted. The piston 3 is connected to a crankshaft 15 via a connecting rod 14. The piston 3, the cylinder 11, and the cylinder head 13 define the combustion chamber 17. The "combustion chamber" is not limited to a space formed when the piston 3 reaches the compression top dead center. The term "combustion chamber" may be used to encompass a broader meaning. That is, the "combustion chamber" may be a space formed by the piston 3, the cylinder 11, and the cylinder head 13 regardless of the position of the piston 3.

The upper surface of the piston 3 is a flat surface. A cavity 31 is formed in the upper surface of the piston 3. The cavity 31 is recessed from the upper surface of the piston 3. The cavity 31 is shallow-dish-shaped. The cavity 31 opposes the injector 6 described below when the piston 3 is positioned at or near the compression top dead center.

The cavity 31 has a projection 311. The projection 311 is aligned with a central axis X of the cylinder 11. The projection 311 has an almost conic shape. The projection 311 extends upward from the bottom of the cavity 31 along the central axis X of the cylinder 11. An upper end of the projection 311 is at almost the same height as an upper surface of the cavity 31.

The cavity 31 also has a depressed portion 312 formed around the projection 311. The depressed portion 312 is formed so as to surround the entire circumference of the projection 311. The cavity 31 has a symmetric shape about the central axis X.

The circumferential side surface of the depressed portion 312 is inclined relative to the central axis X from the bottom surface of the cavity 31 toward the opening of the cavity 31. The inner diameter of the cavity 31 in the depressed portion 312 is gradually increased from the bottom of the cavity 31 toward the opening of the cavity 31.

The lower surface of the cylinder head 13, that is, the ceiling surface of the combustion chamber 17 is formed by an inclined surface 1311 and an inclined surface 1312, as shown in FIG. 2. The inclined surface 1311 is inclined upward from the intake side toward the central axis X. The inclined surface 1312 is inclined upward from the exhaust side toward the central axis X. The ceiling surface of the combustion chamber 17 has a so-called pent-roof shape.

The shape of the combustion chamber 17 is not limited to the shape illustrated in FIG. 2. For example, the shape of the cavity 31, the shape of the upper surface of the piston 3, the shape of the ceiling surface of the combustion chamber 17, and the like can be changed as appropriate.

A geometrical compression ratio of the engine 1 is set to be high in order to improve theoretical thermal efficiency and stabilize CI (Compression Ignition) combustion described below. Specifically, the geometrical compression ratio of the engine 1 is 17 or greater. The geometrical compression ratio may be, for example, 18. The geometrical compression ratio may be set as appropriate within a range from 17 to 20.

The cylinder head 13 has two intake ports 18 formed for each cylinder 11. Each intake port 18 communicates with the combustion chamber 17. An intake valve 21 is disposed in each intake port 18. The intake valve 21 opens and closes a portion between the combustion chamber 17 and the intake port 18. The intake valve 21 is opened and closed at predetermined timing by an intake valve mechanism. In this exemplary configuration, as shown in FIG. 3, the intake valve mechanism has an intake electric S-VT (Sequential-Valve Timing) 23 which is a variable valve mechanism. The intake electric S-VT 23 is configured to sequentially change a rotational phase of an intake cam shaft in a predetermined angular range. Thus, the opening time and the closing time of the intake valve 21 are sequentially changed. The intake valve mechanism may have a hydraulic S-VT instead of the electric S-VT.

The cylinder head 13 also has two exhaust ports 19 formed for each cylinder 11. Each exhaust port 19 communicates with the combustion chamber 17. An exhaust valve 22 is disposed in each exhaust port 19. The exhaust valve 22 opens and closes a portion between the combustion chamber 17 and the exhaust port 19. The exhaust valve 22 is opened and closed at predetermined timing by an exhaust valve mechanism. In this exemplary configuration, as shown in FIG. 3, the exhaust valve mechanism has an exhaust electric S-VT 24 that is a variable valve mechanism. The exhaust electric S-VT 24 is configured to sequentially change a rotational phase of an exhaust cam shaft in a predetermined angular range. Thus, the opening time and the closing time of the exhaust valve 22 are sequentially changed. The exhaust valve mechanism may have a hydraulic S-VT instead of the electric S-VT.

As described below in detail, in the engine 1, the length of an overlap period for an opening time of the intake valve 21 and a closing time of the exhaust valve 22, is adjusted by the intake electric S-VT 23 and the exhaust electric S-VT 24. Thus, residual gas in the combustion chamber 17 is scavenged, or hot burned gas is confined in the combustion chamber 17 (that is, internal EGR (Exhaust Gas Recirculation) gas is introduced into the combustion chamber 17). In this exemplary configuration, the intake electric S-VT 23 and the exhaust electric S-VT 24 form an internal EGR system that is one component of a state quantity setting device. The internal EGR system may not be formed by the S-VT.

The cylinder head 13 has the injector 6 mounted for each cylinder 11. The injector 6 is configured to inject fuel directly into the combustion chamber 17. The injector 6 is disposed in the valley portion of the pent-roof where the inclined surface 1311 on the intake side and the inclined surface 1312 on the exhaust side intersect each other. As shown in FIG. 2, the injector 6 is disposed such that an injection axis thereof is along the central axis X. The injection axis of the injector 6 is aligned with the projection 311 of the cavity 31. The injector 6 opposes the cavity 31. The injection axis of the injector 6 may be shifted with respect to the central axis X of the cylinder 11. Also in this case, the injection axis of the injector 6 is preferably aligned with the projection 311 of the cavity 31.

The injector 6 is implemented by a multi-hole fuel injection valve having a plurality of holes, which is not shown in detail. The injector 6 injects fuel so as to spread fuel spray radially from the center of the combustion chamber 17 as indicated by arrows in FIG. 2.

As described below, the injector 6 may inject fuel at timing when the piston 3 is positioned at or near the compression top dead center. In this case, when the injector 6 injects fuel, fuel spray flows downward along the projection 311 of the cavity 31 while mixing with fresh air, and flows so as to spread radially from the center of the combustion chamber 17 along the bottom surface and the circumferential side surface of the depressed portion 312 in the radially outward direction. Thereafter, air-fuel mixture reaches the opening of the cavity 31, and flows from the radially outer side, along the inclined surface 1311 on the intake side and the inclined surface 1312 on the exhaust side, toward the center of the combustion chamber 17.

The injector 6 may not be a multi-hole injector. The injector 6 may be an outward-opening valve type injector.

A fuel supply system 61 is connected to the injector 6. The fuel supply system 61 has a fuel tank 63 configured to store fuel, and a fuel supply passage 62 that connects the fuel tank 63 and the injector 6 to each other. In the fuel supply passage 62, a fuel pump 65 and a common rail 64 are disposed. The fuel pump 65 feeds fuel to the common rail 64 under pressure. In this exemplary configuration, the fuel pump 65 is a plunger-type pump driven by the crankshaft 15. The common rail 64 is configured to store fuel having been fed under pressure from the fuel pump 65, with a high fuel pressure. When the injector 6 opens, the fuel stored in the common rail 64 is injected through the hole of the injector 6 into the combustion chamber 17. The fuel supply system 61 is configured to be capable of supplying, to the injector 6, fuel under a high pressure of 30 MPa or higher. The highest fuel pressure in the fuel supply system 61 may be, for example, about 120 MPa. The pressure of fuel to be supplied to the injector 6 may be changed according to an operation state of the engine 1. The configuration of the fuel supply system 61 is not limited to the above-described one.

The cylinder head 13 has the spark plug 25 mounted for each cylinder 11. The spark plug 25 forcibly ignites air-fuel mixture in the combustion chamber 17. In this exemplary configuration, the spark plug 25 is disposed on the intake side with respect to the central axis X of the cylinder 11. The spark plug 25 is disposed between the two intake ports 18. The spark plug 25 is mounted to the cylinder head 13 so as to be inclined from the upper side to the lower side toward the center of the combustion chamber 17. The electrode of the spark plug 25 faces the inside of the combustion chamber 17 and is disposed near the ceiling surface of the combustion chamber 17 as shown in FIG. 2.

An intake passage 40 is connected to one side surface of the engine 1. The intake passage 40 communicates with the intake port 18 of each cylinder 11. Through the intake passage 40, gas to be introduced into the combustion chamber 17 flows. An air cleaner 41 for filtering fresh air is disposed at the upstream end portion of the intake passage 40. A surge tank 42 is disposed near the downstream end of the intake passage 40. The intake passage 40 disposed downstream of the surge tank 42 forms independent passages that diverge for the respective cylinders 11, which is not shown in detail. The downstream end of the independent passage is connected to the intake port 18 of each cylinder 11.

A throttle valve 43 is disposed between the air cleaner 41 and the surge tank 42 in the intake passage 40. A valve opening degree of the throttle valve 43 is adjusted, whereby an amount of fresh air to be introduced into the combustion chamber 17 is adjusted. The throttle valve 43 is one component of the state quantity setting device.

A supercharger 44 is disposed downward of the throttle valve 43 in the intake passage 40. The supercharger 44 is configured to perform supercharging with gas that is to be introduced into the combustion chamber 17. In this exemplary configuration, the supercharger 44 is a mechanical supercharger driven by the engine 1. The mechanical supercharger 44 may be, for example, of a Roots type. The mechanical supercharger 44 may have any structure. The mechanical supercharger 44 may be of a Lysholm type or a centrifugal type.

An electromagnetic clutch 45 is disposed between the supercharger 44 and the engine 1. Between the supercharger 44 and the engine 1, the electromagnetic clutch 45 transmits driving force from the engine 1 to the supercharger 44 and interrupts transmission of driving force. As described below, an ECU 10 switches between disengagement and engagement of the electromagnetic clutch 45, whereby the supercharger 44 switches between on and off. That is, the engine 1 is configured to switch between a state where the supercharger 44 performs supercharging with gas that is to be introduced into the combustion chamber 17 and a state where the supercharger 44 does not perform supercharging with gas that is to be introduced into the combustion chamber 17.

An intercooler 46 is disposed downward of the supercharger 44 in the intake passage 40. The intercooler 46 is configured to cool gas compressed by the supercharger 44. The intercooler 46 may be, for example, of a water-cooling type.

A bypass passage 47 is connected to the intake passage 40. The bypass passage 47 connects the upstream portion of the supercharger 44 and the downstream portion of the intercooler 46 to each other in the intake passage 40 so as to bypass the supercharger 44 and the intercooler 46. An air bypass valve 48 is disposed in the bypass passage 47. The air bypass valve 48 adjusts a flow rate of gas that flows in the bypass passage 47.

When the supercharger 44 is off (that is, the electromagnetic clutch 45 is disengaged), the air bypass valve 48 is fully opened. Thus, gas that flows in the intake passage 40 bypasses the supercharger 44 and is introduced into the combustion chamber 17 of the engine 1. The engine 1 operates in a non-supercharged state, that is, by natural aspiration.

When the supercharger 44 is on (that is, the electromagnetic clutch 45 is engaged), a part of gas that passes through the supercharger 44 flows back to the upstream side of the supercharger through the bypass passage 47. By the opening degree of the air bypass valve 48 being adjusted, an amount of backflow can be adjusted, whereby boost pressure for gas to be introduced into the combustion chamber 17 can be adjusted. In this exemplary configuration, a supercharging system 49 is formed by the supercharger 44, the bypass passage 47, and the air bypass valve 48. The air bypass valve 48 is one component of the state quantity setting device.

An exhaust passage 50 is connected to the other side surface of the engine 1. The exhaust passage 50 communicates with the exhaust port 19 of each cylinder 11. Through the exhaust passage 50, exhaust gas discharged from the combustion chamber 17 flows. The upstream portion of the exhaust passage 50 forms independent passages that diverge for the respective cylinders 11, which is not shown in detail. The upstream end of the independent passage is connected to the exhaust port 19 of each cylinder 11. In the exhaust passage 50, an exhaust gas purification system having one or more catalytic converters 51 is disposed. The catalytic converter 51 includes a three-way catalyst. The exhaust gas purification system is not limited to one having the three-way catalyst only.

An EGR passage 52 that forms an external EGR system is connected between the intake passage 40 and the exhaust passage 50. The EGR passage 52 is a passage for recirculating a part of burned gas into the intake passage 40. The upstream end of the EGR passage 52 is connected to a portion downstream of the catalytic converter 51 in the exhaust passage 50. The downstream end of the EGR passage 52 is connected to a portion upstream of the supercharger 44 in the intake passage 40.

A water-cooling type EGR cooler 53 is disposed in the EGR passage 52. The EGR cooler 53 is configured to cool burned gas. An EGR valve 54 is also disposed in the EGR passage 52. The EGR valve 54 is configured to adjust a flow rate of burned gas that flows in the EGR passage 52. The opening degree of the EGR valve 54 is adjusted, whereby an amount of cooled burned gas, that is, external EGR gas, to be recirculated can be adjusted.

In this exemplary configuration, an EGR system 55 is structured by the external EGR system that includes the EGR passage 52 and the EGR valve 54, and the internal EGR system that includes the intake electric S-VT 23 and the exhaust electric S-VT 24 described above. Furthermore, the EGR valve 54 is one component of the state quantity setting device.

The control apparatus for the compression autoignition engine includes the ECU (Engine Control Unit) 10 for operating the engine 1. The ECU 10 is a controller based on a known microcomputer. The ECU 10 includes a central processing unit (CPU) for executing a program, a memory implemented by, for example, a RAM (Random Access Memory) or a ROM (Read Only Memory) for storing programs and data, and an input/output bus for inputting and outputting an electrical signal. The ECU 10 is an example of a controller.

As shown in FIG. 1 and FIG. 3, various sensors SW1 to SW16 are connected to the ECU 10. The sensors SW1 to SW16 output detection signals to the ECU 10. The sensors include sensors described below.

That is, the sensors include: an air flow sensor SW1, disposed downstream of the air cleaner 41 in the intake passage 40, for detecting a flow rate of fresh air that flows in the intake passage 40; a first intake air temperature sensor SW2, disposed downstream of the air cleaner 41 in the intake passage 40, for detecting a temperature of fresh air;

a first pressure sensor SW3, disposed downstream of a position at which the EGR passage 52 is connected to the intake passage 40 and disposed upstream of the supercharger 44, for detecting pressure of gas that flows into the supercharger 44; a second intake air temperature sensor SW4, disposed downstream of the supercharger 44 in the intake passage 40 and disposed upstream of a position at which the bypass passage 47 is connected to the intake passage 40, for detecting a temperature of gas that flows from the supercharger 44; a second pressure sensor SW5 mounted to the surge tank 42 for detecting pressure of gas flowing downstream of the supercharger 44; pressure sensors SW6, mounted to the cylinder heads 13 so as to correspond to the cylinders 11, respectively, each of which detects pressure in the combustion chamber 17; an exhaust air temperature sensor SW7 disposed in the exhaust passage 50 for detecting a temperature of exhaust gas discharged from the combustion chamber 17; a linear $O_2$ sensor SW8, disposed upstream of the catalytic converter 51 in the exhaust passage 50, for detecting the concentration of oxygen in exhaust gas; a lambda $O_2$ sensor SW9, disposed downstream of the catalytic converter 51 in the exhaust passage 50, for detecting the concentration of oxygen in exhaust gas; a water temperature sensor SW10 mounted to the engine 1 for detecting a temperature of cooling water; a crank angle sensor SW11 mounted to the engine 1 for detecting a rotational angle of the crankshaft 15; an accelerator opening degree sensor SW12 mounted to an accelerator pedal mechanism for detecting an accelerator opening degree corresponding to an amount of operation of an accelerator pedal; an intake cam angle sensor SW13 mounted to the engine 1 for detecting a rotational angle of an intake cam shaft; an exhaust cam angle sensor SW14 mounted to the engine 1 for detecting a rotational angle of an exhaust cam shaft; an EGR differential pressure sensor SW15 disposed in the EGR passage 52 for detecting a differential pressure between the upstream side and the downstream side of the EGR valve 54; and a fuel pressure sensor SW16, mounted to the common rail 64 of the fuel supply system 61, for detecting pressure of fuel to be supplied to the injector 6.

The ECU 10 determines an operation state of the engine 1 and calculates a control amount for each device, based on the detection signals. The ECU 10 outputs control signals based on the calculated control amounts, to the injector 6, the spark plug 25, the intake electric S-VT 23, the exhaust electric S-VT 24, the fuel supply system 61, the throttle valve 43, the EGR valve 54, the electromagnetic clutch 45 of the supercharger 44, and the air bypass valve 48. For example, the ECU 10 adjusts an opening degree of the air bypass valve 48 based on a differential pressure, between the front side and the rear side of the supercharger 44, obtained according to detection signals from the first pressure sensor SW3 and the second pressure sensor SW5, thereby adjusting the boost pressure. Further, the ECU 10 adjusts an opening degree of the EGR valve 54 based on the differential pressure, between the front side and the rear side of the EGR valve 54, obtained according to a detection signal from the EGR differential pressure sensor SW15, thereby adjusting an amount of external EGR gas to be introduced into the combustion chamber 17. The control of the engine 1 by the ECU 10 will be described below in detail.

(Operation Region of Engine)

Figure 4:
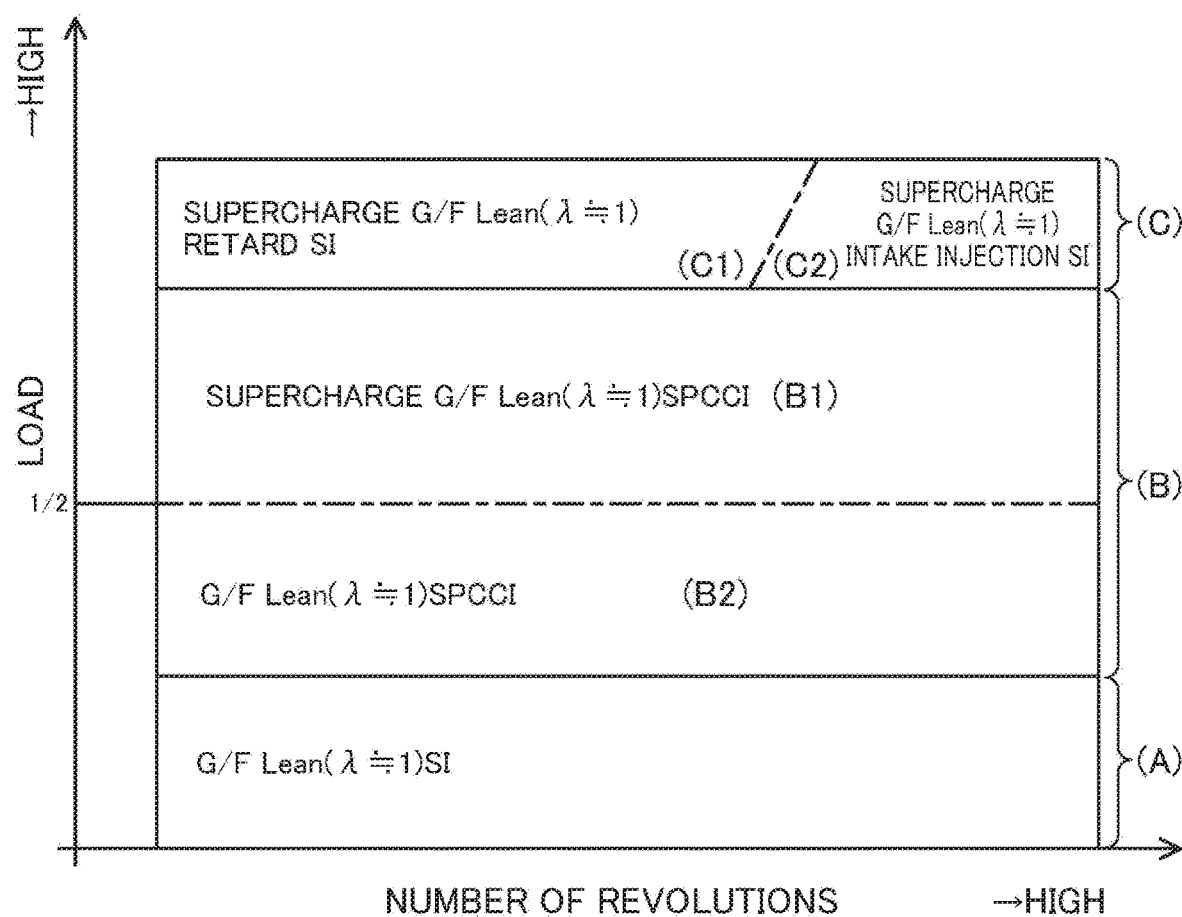
FIG. 4 illustrates an operation region of the engine.

FIG. 4 illustrates an operation region of the engine 1. The operation region of the engine 1 is roughly divided into three regions according to whether load is high or low. Specifically, the three regions are a low load region (A) that includes an idling operation region, a high load region (C) that includes full load, and an intermediate load region (B) between the low load region (A) and the high load region (C). Combustion by compression autoignition is performed in the intermediate load region mainly for improving fuel economy and improving exhaust gas performance in the engine 1. Hereinafter, combustion modes in the low load region, the intermediate load region, and the high load region, will be sequentially described.

(Low Load Region)

When the operation state of the engine 1 is in the low load region, an amount of injected fuel is small. Therefore, an amount of heat generated when air-fuel mixture is combusted in the combustion chamber 17 is small, whereby the temperature in the combustion chamber 17 becomes low. Since the temperature of exhaust gas also becomes low, even when internal EGR gas is introduced into the combustion chamber 17 as described below, the temperature in the combustion chamber 17 is not increased to a degree at which autoignition can be stably performed. The combustion mode when the operation state of the engine 1 is in the low load region is SI (Spark Ignition) combustion in which the spark plug 25 ignites air-fuel mixture in the combustion chamber 17 and the air-fuel mixture is thus combusted by flame propagation. Hereinafter, the combustion mode in the low load region may be referred to as low load SI combustion.

When the operation state of the engine 1 is in the low load region, an air-fuel ratio (A/F) of air-fuel mixture is the theoretical air-fuel ratio (A/F=14.7). When exhaust gas discharged from the combustion chamber 17 is purified by the three-way catalyst, the engine 1 has good exhaust gas performance. The A/F of air-fuel mixture may be set so as to fall within a purification window of the three-way catalyst. Therefore, the excess air ratio λ of the air-fuel mixture may be 1.0±0.2.

When the operation state of the engine 1 is in the low load region, the EGR system 55 introduces EGR gas into the combustion chamber 17 in order to improve fuel economy performance of the engine 1. The G/F of the air-fuel mixture, that is, a mass ratio between the total gas and fuel in the combustion chamber 17 is set in a range from 18.5 to 30. The air-fuel mixture is EGR gas lean. The dilution rate of the air-fuel mixture is high. When the G/F of the air-fuel mixture is, for example, 25, SI combustion can be stably performed without causing autoignition of the air-fuel mixture, in the low load operation region. In the low load region, the G/F of the air-fuel mixture is uniformly maintained regardless of whether or not load on the engine 1 is high or low. Thus, the SI combustion is stabilized over the entirety of the low load region. Furthermore, fuel economy of the engine 1 is improved, and exhaust gas performance becomes good.

When the operation state of the engine 1 is in the low load region, an amount of fuel is small. Therefore, in order to set λ of the air-fuel mixture to 1.0±0.2 and set the G/F in a range from 18.5 to 30, an amount of gas to be filled in the combustion chamber 17 needs to be less than 100%. Specifically, the engine 1 performs throttling for adjusting an opening degree of the throttle valve 43 and/or Miller cycle for delaying, to the intake bottom dead center or later, the closing time of the intake valve 21.

In the low-load low-rotation region in the low load region, an amount of filled gas is further reduced, whereby the combustion temperature of the air-fuel mixture and the temperature of exhaust gas may be enhanced. Thus, the catalytic converter 51 is advantageously maintained in an active state.

(Intermediate Load Region)

When the operation state of the engine 1 is in the intermediate load region, an amount of injected fuel is increased. The temperature in the combustion chamber 17 becomes high, whereby autoignition can be stably performed. The engine 1 performs CI combustion in the intermediate load region in order to improve fuel economy and improve exhaust gas performance.

In combustion by autoignition, if the temperature in the combustion chamber 17 before start of compression varies, timing of autoignition is greatly changed. Therefore, in the intermediate load region, the engine 1 performs SPCCI combustion in which SI combustion and CI combustion are combined. In the SPCCI combustion, the spark plug 25 forcibly ignites air-fuel mixture in the combustion chamber 17, and the air-fuel mixture is thus combusted by flame propagation, and unburned air-fuel mixture is combusted by autoignition due to heat generation by the SI combustion enhancing the temperature in the combustion chamber 17. By adjusting an amount of heat generated by the SI combustion, variation of the temperature in the combustion chamber 17 before start of compression can be absorbed. Even if the temperature in the combustion chamber 17 before start of compression varies, when the start timing of the SI combustion is adjusted by, for example, adjusting the ignition timing, timing of autoignition can be controlled.

In the SPCCI combustion, in order to accurately control the timing of autoignition, the timing of autoignition needs to change according to the ignition timing being changed. Sensitivity for change of timing of autoignition with respect to change of ignition timing is preferably high.

The inventors of the present invention have found through study that, when $\lambda$ of air-fuel mixture is $1.0\pm0.2$ and a G/F of the air-fuel mixture is in a range from 18.5 to 30, timing of autoignition changes with respect to change of ignition timing. Therefore, when the operation state of the engine 1 is in the intermediate load region, the engine 1 sets a state inside the combustion chamber 17 such that $\lambda$ of air-fuel mixture is $1.0\pm0.2$ and a G/F of the air-fuel mixture is in a range from 18.5 to 30.

By timing of autoignition being accurately controlled, increase of combustion noise can be avoided when the operation state of the engine 1 is in the intermediate load region. Furthermore, a dilution rate of the air-fuel mixture is set to be as high as possible to perform CI combustion, whereby the engine 1 can have high fuel economy performance. Moreover, $\lambda$ of air-fuel mixture is set to $1.0\pm0.2$, whereby exhaust gas can be purified by the three-way catalyst, so that the engine 1 has good exhaust gas performance.

As described above, in the low load region, a G/F of air-fuel mixture is in a range from 18.5 to 30 (for example, 25), and $\lambda$ of the air-fuel mixture is set to $1.0\pm0.2$. The state quantity of the combustion chamber 17 does not greatly change between when the operation state of the engine 1 is in the low load region and when the operation state of the engine 1 is in the intermediate load region. Therefore, robustness of control of the engine 1 with respect to change of load on the engine 1 is enhanced.

When the operation state of the engine 1 is in the intermediate load region, an amount of fuel is increased unlike in the low load region. Therefore, an amount of gas to be filled in the combustion chamber 17 need not be adjusted. The opening degree of the throttle valve 43 is a fully open degree.

When load on the engine 1 is increased and an amount of fuel is further increased, an amount of gas introduced into the combustion chamber 17 by natural aspiration is insufficient for setting $\lambda$ of air-fuel mixture to $1.0\pm0.2$ and setting a G/F of the air-fuel mixture in a range from 18.5 to 30. Therefore, the supercharger 44 supercharges the combustion chamber 17 with gas to be introduced thereinto, in a region in which load is higher than a predetermined load in the intermediate load region. The intermediate load region (B) is divided into a first intermediate load region (B1) in which the load is higher than a predetermined load and supercharging is performed, and a second intermediate load region (B2) in which the load is the predetermined load or lower load and no supercharging is performed. The predetermined load is, for example, ½ load. The second intermediate load region is a region in which load is lower than load in the first intermediate load region. Hereinafter, the combustion mode in the first intermediate load region may be referred to as supercharge SPCCI combustion, and the combustion mode in the second intermediate load region may be referred to as non-supercharge SPCCI combustion.

In the second intermediate load region in which no supercharging is performed, as an amount of fuel is increased, fresh air to be introduced into the combustion chamber 17 is increased, while EGR gas is reduced. The G/F of the air-fuel mixture is reduced when load on the engine 1 is increased. Since the opening degree of the throttle valve 43 is a fully open degree, the engine 1 adjusts an amount of EGR gas to be introduced into the combustion chamber 17, whereby an amount of fresh air to be introduced into the combustion chamber 17 is adjusted. In the second intermediate load region, the state quantity of the combustion chamber 17 is such that, for example, $\lambda$ of the air-fuel mixture is almost uniformly 1.0, while the G/F of the air-fuel mixture changes in a range from 25 to 28.

Meanwhile, in the first intermediate load region in which supercharging is performed, as an amount of fuel is increased, both fresh air and EGR gas to be introduced into the combustion chamber 17 are increased, in the engine 1. The G/F of the air-fuel mixture is constant even when the load on the engine 1 is increased. In the first intermediate load region, the state quantity of the combustion chamber 17 is such that, for example, $\lambda$ of the air-fuel mixture is almost uniformly 1.0 and the G/F of the air-fuel mixture is uniformly 25.

(High Load Region)

When the operation state of the engine 1 is in the high load region, an amount of injected fuel is large. Therefore, even when SPCCI combustion is performed, it is difficult to reduce combustion noise. In addition, since the temperature in the combustion chamber 17 is increased, even when CI combustion is attempted, abnormal combustion such as preignition or knocking is likely to occur. Therefore, the combustion mode is SI combustion when the operation state of the engine 1 is in the high load region. Hereinafter, the combustion mode in the high load region may be referred to as high load SI combustion.

When the operation state of the engine 1 is in the high load region, $\lambda$ of the air-fuel mixture is $1.0\pm0.2$. Furthermore, the G/F of the air-fuel mixture is basically set in a range from 18.5 to 30. In the high load region, the opening degree of the throttle valve 43 is a fully open degree, and the supercharger 44 performs supercharging.

In the high load region, an amount of EGR gas is reduced according to load being increased in the engine 1. The G/F of the air-fuel mixture becomes small when the load on the engine 1 is increased. An amount of fresh air to be introduced into the combustion chamber 17 is increased according to an amount of the EGR gas being reduced. Therefore, an amount of fuel can be increased. The maximum output of the engine 1 is advantageously enhanced. The G/F of the air-fuel mixture may be about 17 at near full load.

The G/F of the air-fuel mixture may be changed within a range from 17 to 25 in the high load region. Therefore, in the entirety of the operation region of the engine 1 including the low load region, the intermediate load region, and the high load region, the G/F of the air-fuel mixture may be changed within a range from 17 to 30.

The state quantity of the combustion chamber 17 does not greatly change between when the operation state of the engine 1 is in the high load region and when the operation state of the engine 1 is the intermediate load region. Robustness of control of the engine 1 with respect to change of load on the engine 1 is enhanced.

As described above, the engine 1 performs SI combustion in the high load region. However, high geometrical compression ratio or the like causes a problem that abnormal combustion such as preignition or knocking is likely to occur.

Therefore, the engine 1 is configured to avoid the abnormal combustion by fuel injection mode being properly designed for the high load region. Specifically, the ECU 10 outputs control signals to the fuel supply system 61 and the injector 6 such that fuel is injected into the combustion chamber 17 with high fuel pressure of 30 MPa or higher at timing in a period (hereinafter, the period is referred to as retard period) between the later stage of the compression stroke and the initial stage of the expansion stroke. The ECU 10 further outputs a control signal to the spark plug 25 such that the air-fuel mixture is ignited at timing at or near the compression top dead center after injection of fuel. In the below description, injection of fuel into the combustion chamber 17 with high fuel pressure at timing in the retard period is referred to as high-pressure retard injection.

In the high-pressure retard injection, a time for reaction of the air-fuel mixture is shortened to avoid abnormal combustion. That is, the time for reaction of the air-fuel mixture is a time obtained by addition of (1) a period (that is, injection period) in which the injector 6 injects fuel, (2) a period (that is, air-fuel mixture forming period) in which burnable air-fuel mixture is formed around the spark plug 25 after injection of fuel has ended, and (3) a period (that is, combustion period) up to the end of the SI combustion started by ignition.

When fuel is injected into the combustion chamber 17 with a high fuel pressure, the injection period and the air-fuel mixture forming period are each shortened. When the injection period and the air-fuel mixture forming period are shortened, timing at which injection of fuel starts can be close to ignition timing. In the high-pressure retard injection, fuel is injected into the combustion chamber 17 with a high pressure. Therefore, fuel injection is performed at timing in the retard period from the later stage of the compression stroke to the initial stage of the expansion stroke.

When fuel is injected into the combustion chamber 17 with a high fuel pressure, turbulent energy in the combustion chamber 17 becomes high. When the timing of fuel injection is made close to the compression top dead center, the SI combustion can be started in a state where the turbulent energy in the combustion chamber 17 is high. As a result, combustion period is shortened.

The high-pressure retard injection allows the injection period, the air-fuel mixture forming period, and the combustion period to be each shortened. As compared to a case where fuel is injected into the combustion chamber 17 in the intake stroke, the high-pressure retard injection allows a time for reaction of the air-fuel mixture to be greatly shortened. The high-pressure retard injection allows a time for reaction of the air-fuel mixture to be shortened, whereby abnormal combustion can be avoided.

In the technical field of the engine control, retarding of ignition timing has been conventionally performed in order to avoid abnormal combustion. However, when the ignition timing is retarded, fuel economy performance is degraded. In the high-pressure retard injection, ignition timing need not be retarded. By using the high-pressure retard injection, the fuel economy performance is improved.

When the fuel pressure is, for example, 30 MPa or higher, the injection period, the air-fuel mixture forming period, and the combustion period can be effectively shortened. The fuel pressure may be preferably set as appropriate according to the properties of fuel. The upper limit value of the fuel pressure may be, for example, 120 MPa.

When the number of revolutions of the engine 1 is small, time for which a crank angle is changed by the same angle is long. Therefore, shortening of a time in which air-fuel mixture can react, by the high-pressure retard injection, is particularly effective for avoiding abnormal combustion. Meanwhile, when the number of revolutions of the engine 1 is great, time for which a crank angle is changed by the same angle is short. Therefore, shortening of a time in which air-fuel mixture can react is not so effective for avoiding abnormal combustion.

Furthermore, in the high-pressure retard injection, injection of fuel into the combustion chamber 17 starts around the compression top dead center. Therefore, in the compression stroke, gas which does not contain fuel, in other words, gas having a high specific heat ratio is compressed in the combustion chamber 17. In a case where the number of revolutions of the engine 1 is great, when the high-pressure retard injection is performed, the temperature in the combustion chamber 17 at the compression top dead center, that is, the compression end temperature becomes high. When the compression end temperature becomes high, abnormal combustion such as knocking may be caused.

In the engine 1, the high load region (C) is divided into a first high load region (C1) on the low rotation side, and a second high load region (C2) in which the number of revolutions is higher than that in the first high load region (C1). When the high load region is divided into three equal regions that are a low rotation region, an intermediate rotation region, and a high rotation region, the first high load region may include the low rotation region and the intermediate rotation region. When the high load region is divided into the three equal regions that are the low rotation region, the intermediate rotation region, and the high rotation region, the second high load region may include the high rotation region.

In the first high load region, the injector 6 receives a control signal from the ECU 10, to perform the above-described high-pressure retard injection. In the second high load region, the injector 6 receives a control signal from the ECU 10, to perform fuel injection at predetermined timing in the intake stroke. The fuel injection in the intake stroke does not require a high fuel pressure. The ECU 10 outputs a control signal to the fuel supply system 61 such that the fuel pressure is lower than a fuel pressure in the high-pressure retard injection (for example, such that the fuel pressure is less than 40 MPa). By the fuel pressure being lowered, the mechanical resistance loss of the engine 1 is reduced, so that fuel economy is advantageously improved.

When fuel is injected into the combustion chamber 17 in the intake stroke, the specific heat ratio of gas in the combustion chamber 17 is reduced, whereby the compression end temperature becomes low. The compression end temperature becomes low, whereby the engine 1 is allowed to avoid abnormal combustion. The ignition timing need not be retarded in order to avoid abnormal combustion, whereby the spark plug 25 ignites air-fuel mixture at timing of or at timing near the compression top dead center in the second high load region, as in the first high load region.

In the first high load region, the high-pressure retard injection prevents occurrence of autoignition of the air-fuel mixture. Therefore, the engine 1 can perform stable SI combustion. In the second high load region, the fuel injection in the intake stroke prevents occurrence of autoignition of the air-fuel mixture. Therefore, the engine 1 can perform stable SI combustion.

(Sensitivity for Change of Timing of Autoignition)

Sensitivity for change of timing of autoignition with respect to change of ignition timing in the above-described SPCCI combustion will be described. The inventors of the present invention have found through study that the SI combustion by flame propagation needs to be stably performed before autoignition of air-fuel mixture occurs in order to cause timing of autoignition to change with respect to change of ignition timing in the SPCCI combustion.

One of the factors associated with stability of the SI combustion is turbulent combustion speed. When the turbulent combustion speed is high, the SI combustion is stabilized. The turbulent combustion speed is influenced by an air-fuel ratio (or excess air ratio λ) of air-fuel mixture, an EGR (Exhaust Gas Recirculation) ratio (that is, dilution rate) of the air-fuel mixture, a temperature and a pressure in the combustion chamber 17, turbulent energy in the combustion chamber 17, or the like.

The inventors of the present invention have examined, through simulation, an excess air ratio λ of air-fuel mixture, a dilution rate (in the description herein, G/F that is a weight ratio between the total gas and fuel in the combustion chamber 17) of the air-fuel mixture, a temperature and a pressure in the combustion chamber 17, and turbulent energy in the combustion chamber 17, for obtaining a turbulent combustion speed necessary for assuring stability of the SI combustion. The condition for the simulation is a condition that the engine 1 operates with a low load, and only internal EGR gas is introduced into the combustion chamber 17, to make the temperature in the combustion chamber 17 as high as possible.

From the viewpoint of assuredly avoiding great combustion noise caused by knocking, the lower limit of the G/F of air-fuel mixture is 18.5. Furthermore, when, with such a lean air-fuel ratio, a three-way catalyst is used in order to prevent NOx emissions, the excess air ratio λ of the air-fuel mixture is 1.0±0.2.

Figure 12:
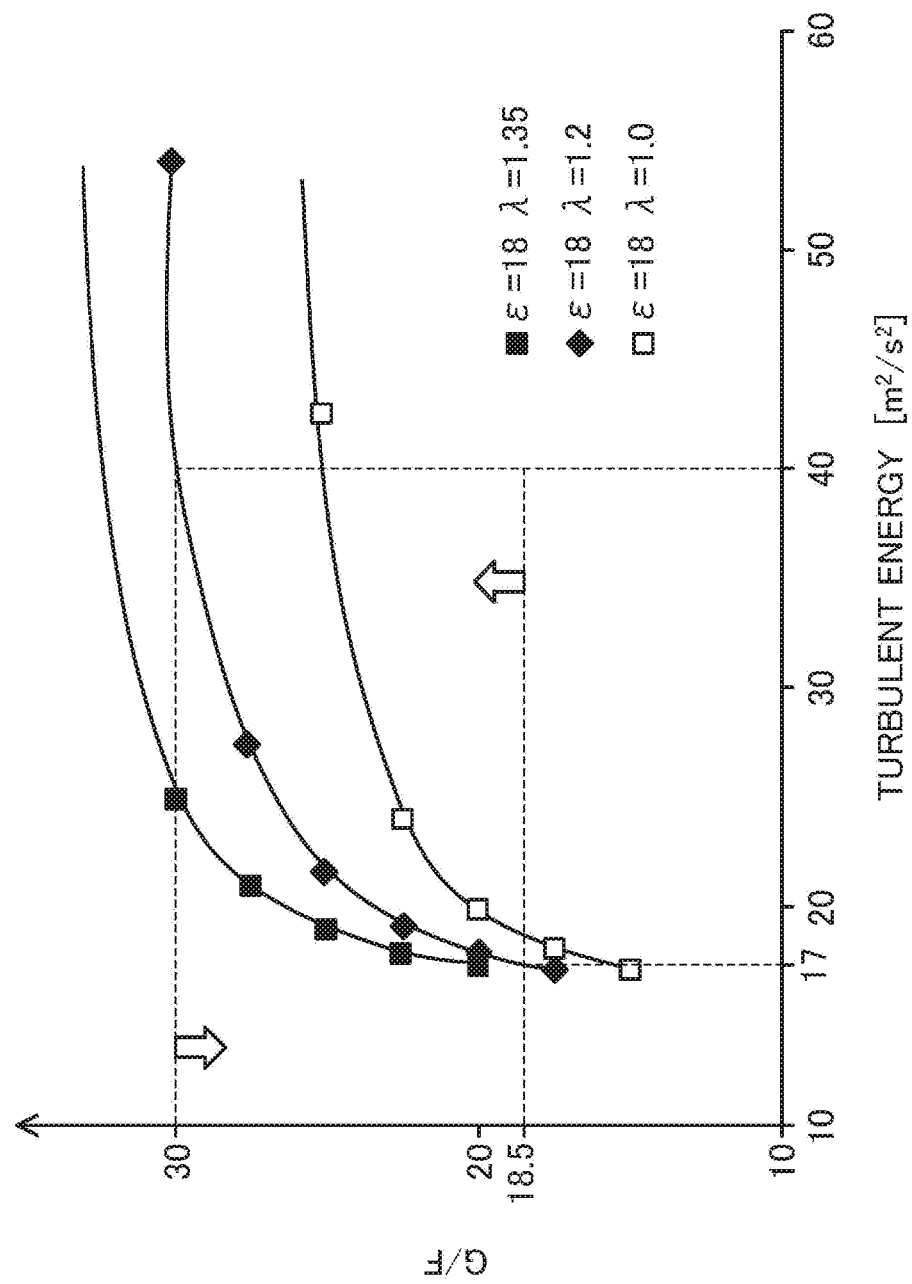
FIG. 12 illustrates a relationship between a G/F of air-fuel mixture, and turbulent energy necessary for obtaining a desired turbulent combustion speed, when the engine operates at a predetermined number of revolutions with a low load, and only internal EGR gas is introduced into the combustion chamber.

From the viewpoint of enhancing fuel economy performance of the engine 1, the G/F of air-fuel mixture is preferably great. Therefore, the inventors of the present invention have examined a relationship between the G/F of air-fuel mixture and turbulent energy necessary for obtaining a desired turbulent combustion speed as shown in FIG. 12. The engine 1 operates at 2000 rpm as the number of revolutions with a low load. Furthermore, internal EGR gas is introduced into the combustion chamber 17. The closing time of the intake valve 21 is 91° ABDC. The geometrical compression ratio of the engine 1 is 18.

According to FIG. 12, when λ of the air-fuel mixture is 1.2, the characteristic line of the G/F is like a saturation curve representing saturation at about 30. Meanwhile, when the number of revolutions of the engine 1 is 2000 rpm, turbulent energy of 40 $m^2/s^2$ can be obtained. It has been newly found that, even if the turbulent energy is obtained so as to be greater than 40 $m^2/s^2$, the G/F of the air-fuel mixture is not likely to be greater than 30. According to FIG. 12, the upper limit of the G/F of air-fuel mixture is 30 in order to assure stability of the SI combustion.

According to the above-described examination, the G/F of air-fuel mixture needs to be set in a range from 18.5 to 30. According to FIG. 12, when λ of the air-fuel mixture is 1.0 or 1.2, and the range of the G/F is in a range from 18.5 to 30, the range of the turbulent energy necessary for stabilizing the SI combustion is 17 to 40 $m^2/s^2$.

Figure 13:
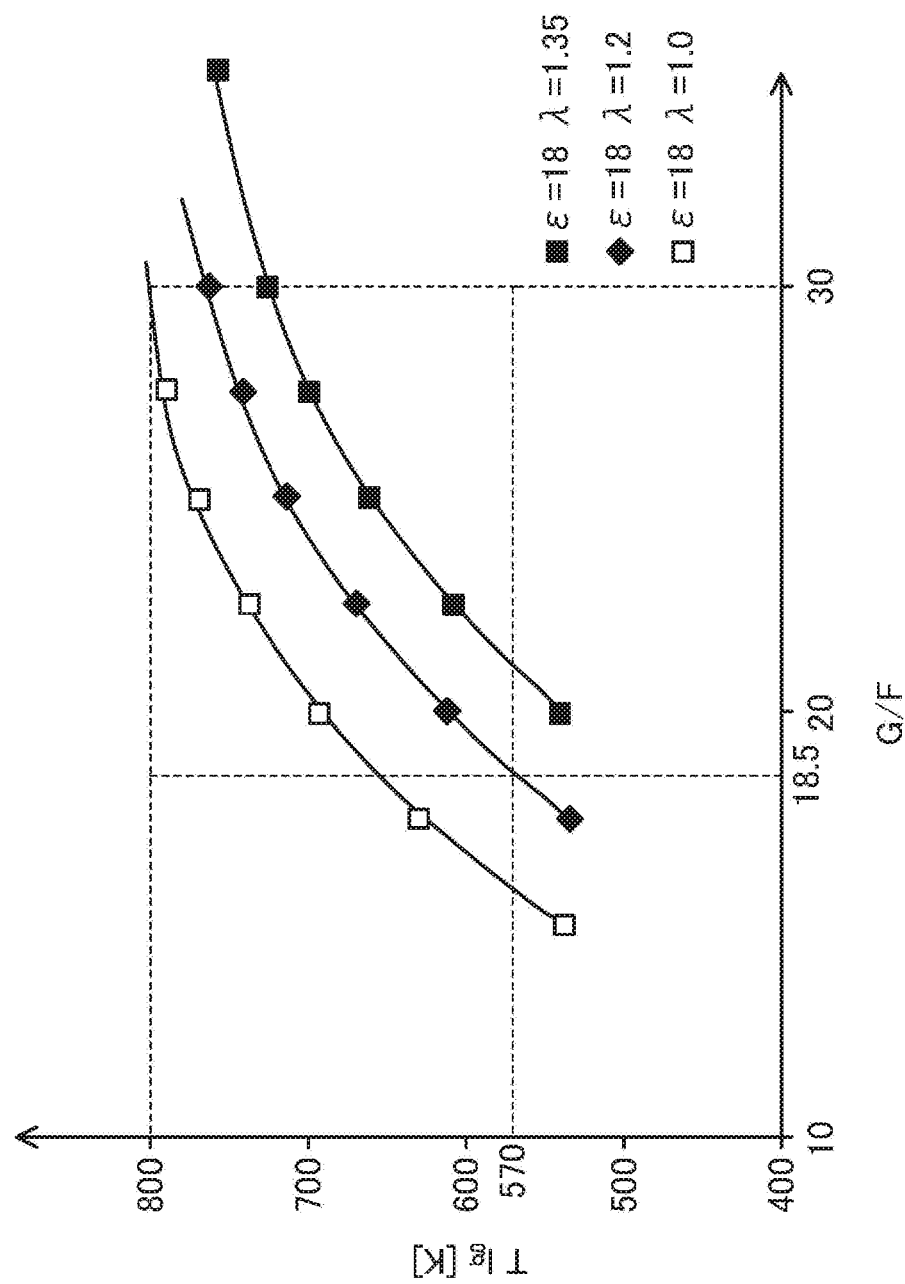
FIG. 13 illustrates a relationship between a G/F of air-fuel mixture and temperature in the combustion chamber for obtaining the necessary turbulent energy shown in FIG. 12.

FIG. 13 illustrates a relationship, between a temperature at ignition timing and the G/F of air-fuel mixture in the combustion chamber 17, which is necessary for obtaining a desired turbulent combustion speed, under the same condition as in FIG. 12. When λ of the air-fuel mixture is 1.0 or 1.2, and the G/F is in a range from 18.5 to 30, a necessary temperature TIg (K) in the combustion chamber 17 at ignition timing is 570 to 800 K.

Figure 14:
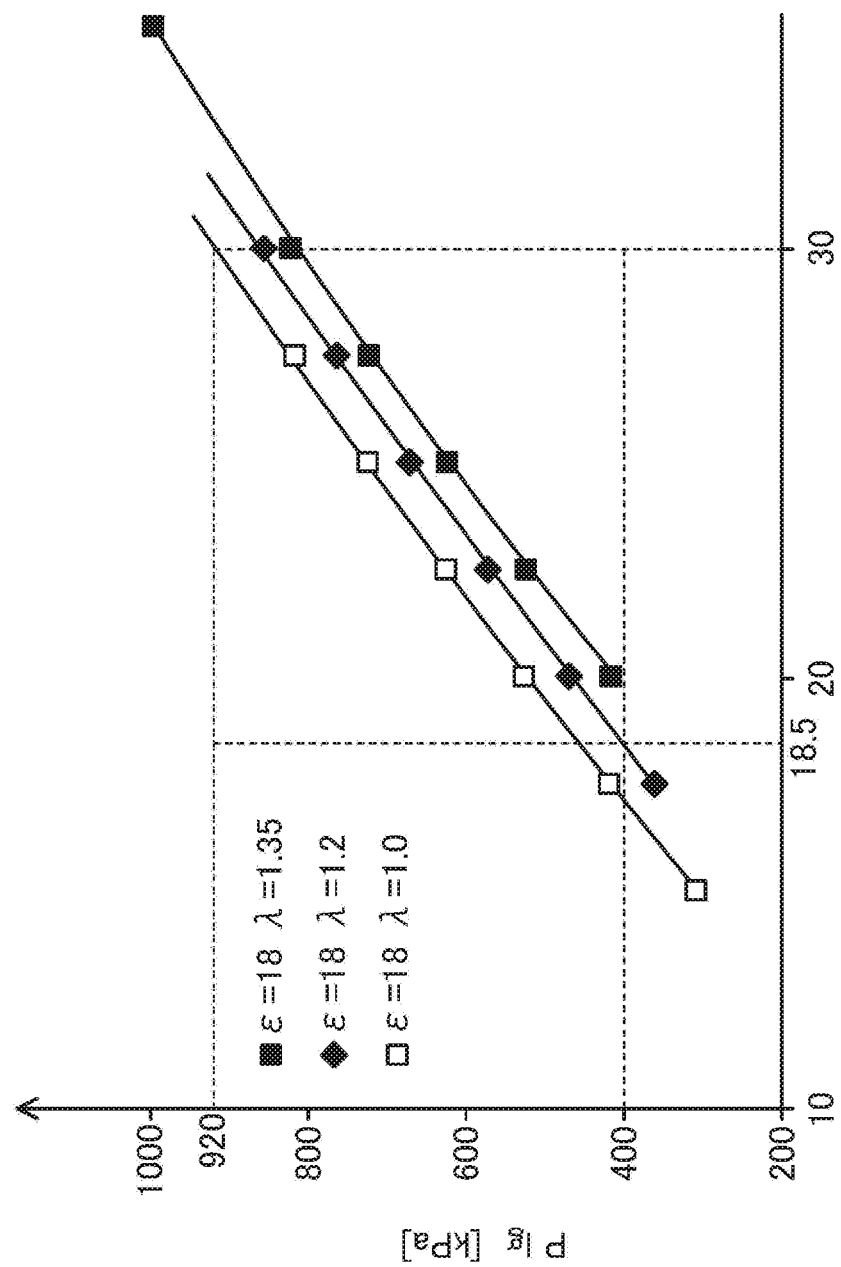
FIG. 14 illustrates a relationship between a G/F of air-fuel mixture and pressure in the combustion chamber for obtaining the necessary turbulent energy shown in FIG. 12.

FIG. 14 illustrates a relationship, between a pressure at ignition timing and the G/F of air-fuel mixture in the combustion chamber 17, which is necessary for obtaining a desired turbulent combustion speed, under the same condition as in FIG. 12. When λ of the air-fuel mixture is 1.0 or 1.2, and the G/F is in a range from 18.5 to 30, a necessary pressure PIg (kPa) in the combustion chamber 17 at ignition timing is 400 to 920 kPa.

Even if the geometrical compression ratio of the engine 1 is changed in a range of 14 to 20, influence on a relationship, between the G/F of air-fuel mixture and turbulent energy, which is necessary for obtaining a desired turbulent combustion speed, is little, which is not shown.

Figure 15:
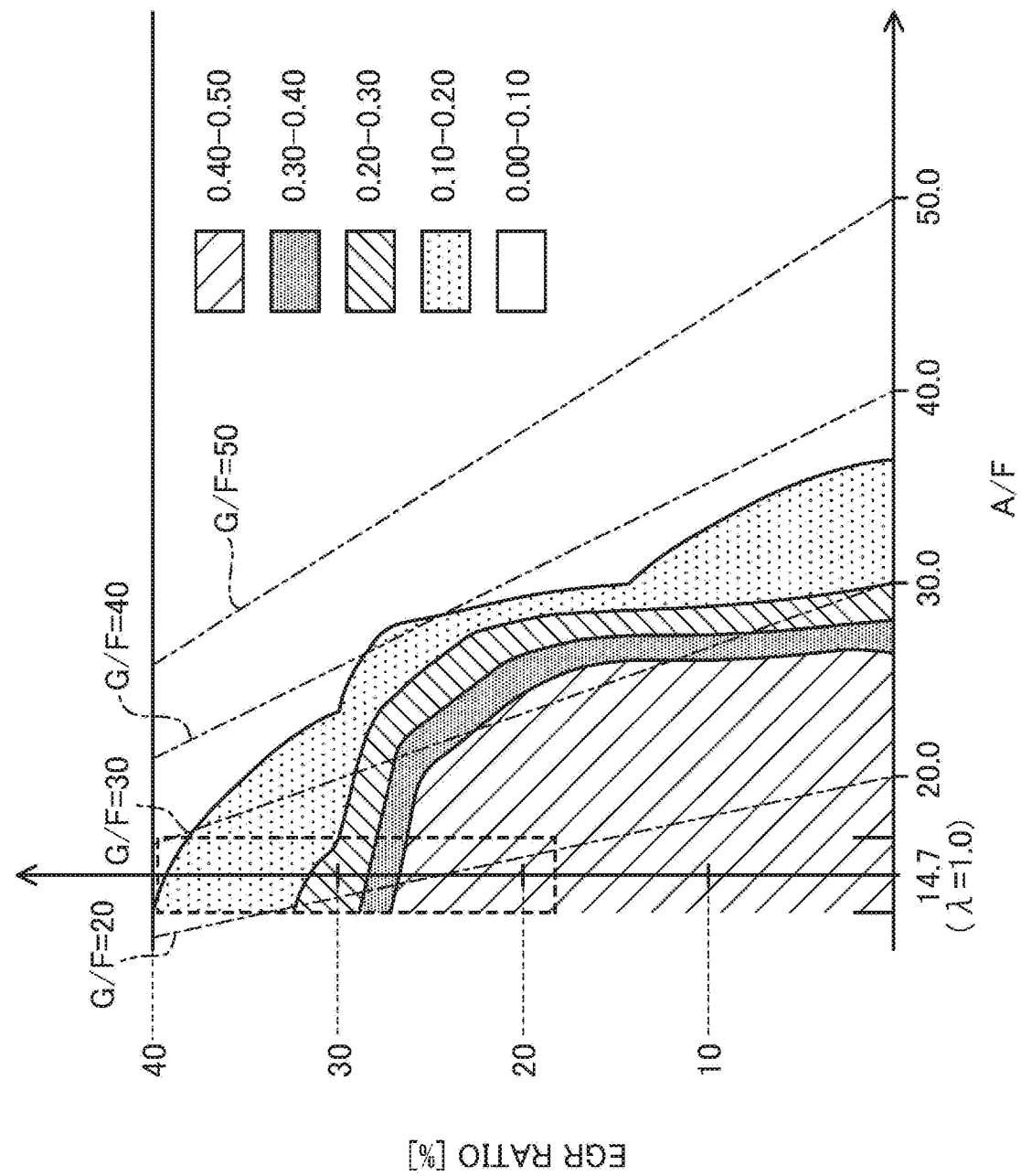
FIG. 15 is a contour view illustrating a contour on a plane in which the vertical axis represents an EGR ratio of air-fuel mixture and the horizontal axis represents an A/F of the air-fuel mixture, illustrating a change rate of change of autoignition timing with respect to change of ignition timing in SPCCI combustion.

FIG. 15 is a contour view showing a change rate of change of autoignition timing with respect to change of ignition timing (=(change of crank angle at autoignition timing)/(change of crank angle at ignition timing)), which is obtained by an experiment. The change rate represents a magnitude of change, of a crank angle at autoignition timing, obtained when ignition timing is changed by 1° as a crank angle. The greater the value of the change rate is, the higher the sensitivity for change of timing of autoignition with respect to change of ignition timing is. The less the value of the change rate is, the lower the sensitivity for change of timing of autoignition with respect to change of ignition timing is.

In FIG. 15, the vertical axis represents an EGR ratio of air-fuel mixture, and the horizontal axis represents an A/F of air-fuel mixture. Sensitivity for change of timing of autoignition with respect to change of ignition timing is reduced toward the upper right portion in the view. Sensitivity for change of timing of autoignition is enhanced toward the lower left portion in the view. In FIG. 15, it is found that, in a range, enclosed by a broken line, in which λ of the air-fuel mixture is 1.0±0.2 and the G/F is in a range from 18.5 to 30, timing of autoignition is changed with respect to change of ignition timing. The upper limit of the EGR ratio is preferably 40% from the viewpoint of combustion stability.

That is, when a state inside the combustion chamber 17 is such that λ of air-fuel mixture is 1.0±0.2 and the G/F is in a range from 18.5 to 30, SI combustion is stabilized, so that timing of autoignition can be accurately controlled in the SPCCI combustion.

(SPCCI Combustion)

Figure 5:
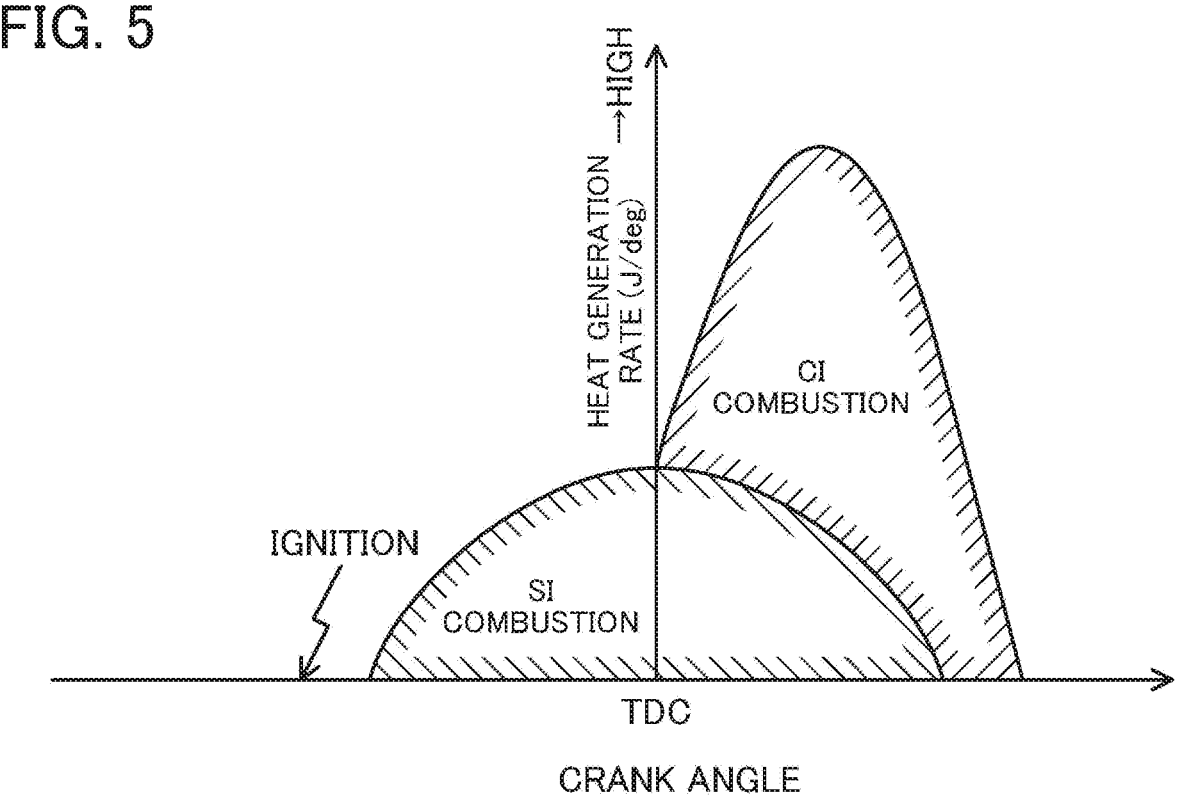
FIG. 5 conceptually illustrates change of a heat generation rate in SPCCI combustion in which SI combustion and CI combustion are combined.

Next, the above-described SPCCI combustion will be described in more detail. FIG. 5 illustrates a waveform representing an example of change of a heat generation rate with respect to a crank angle in the SPCCI combustion. When the spark plug 25 ignites air-fuel mixture around the compression top dead center, more accurately, at predetermined timing before the compression top dead center, combustion by flame propagation starts. Heat generation at SI combustion is gentler than heat generation at CI combustion. Therefore, the waveform of the heat generation rate has a relatively small slope. A pressure variation (dp/dθ) in the combustion chamber 17 at the SI combustion is gentler than that at the CI combustion, which is not shown.

When the temperature and pressure in the combustion chamber 17 are enhanced by the SI combustion, autoignition of unburned air-fuel mixture occurs. In the example of FIG. 5, the slope of the waveform of the heat generation rate changes from small to large at or near the compression top dead center. That is, the waveform of the heat generation rate has an inflection point at timing when the CI combustion starts.

After the start of the CI combustion, the SI combustion and the CI combustion are performed in parallel. In CI combustion, heat generation is greater than in the SI combustion. Therefore, the heat generation rate becomes relatively great. However, the CI combustion is performed after the compression top dead center, and the piston 3 has been moved downward due to motoring. The slope of the waveform of the heat generation rate is prevented from becoming excessively great due to the CI combustion. dp/dθ at the CI combustion becomes relatively gentle.

dp/dθ can be used as an index representing combustion noise. As described above, dp/dθ can be reduced in the SPCCI combustion, so that the combustion noise can be prevented from becoming excessively great. Combustion noise can be reduced to an allowable level or lower level.

When the CI combustion ends, the SPCCI combustion ends. The combustion period of the CI combustion is shorter than that of the SI combustion. The combustion end time of the SPCCI combustion is advanced as compared to the SI combustion. In other words, in the SPCCI combustion, the combustion end time in the expansion stroke can be made close to the compression top dead center. The SPCCI combustion is more advantageous than the SI combustion in improvement of fuel economy performance of the engine 1.

Therefore, the SPCCI combustion enables both prevention of combustion noise and improvement of fuel economy performance.

An SI rate is defined as a parameter representing the characteristics of the SPCCI combustion. The SI rate is defined as a ratio of an amount of heat generated by the SI combustion to a total amount of heat generated by the SPCCI combustion. That is, in FIG. 5, the SI rate is represented as SI rate=(area of SI combustion)/(area of SPCCI combustion). The SI rate is a ratio between SI combustion and CI combustion in the SPCCI combustion in which the SI combustion and the CI combustion are combined. When the SI rate is high, the proportion of the SI combustion is high. When the SI rate is low, the proportion of the CI combustion is high.

The SI rate is not limited to one defined as described above. The SI rate may be variously defined. For example, the SI rate may be a ratio of an amount of heat generated by the SI combustion, to an amount of heat generated by the CI combustion. That is, in FIG. 5, the SI rate=(area of SI combustion)/(area of CI combustion) may be satisfied.

Figure 6:
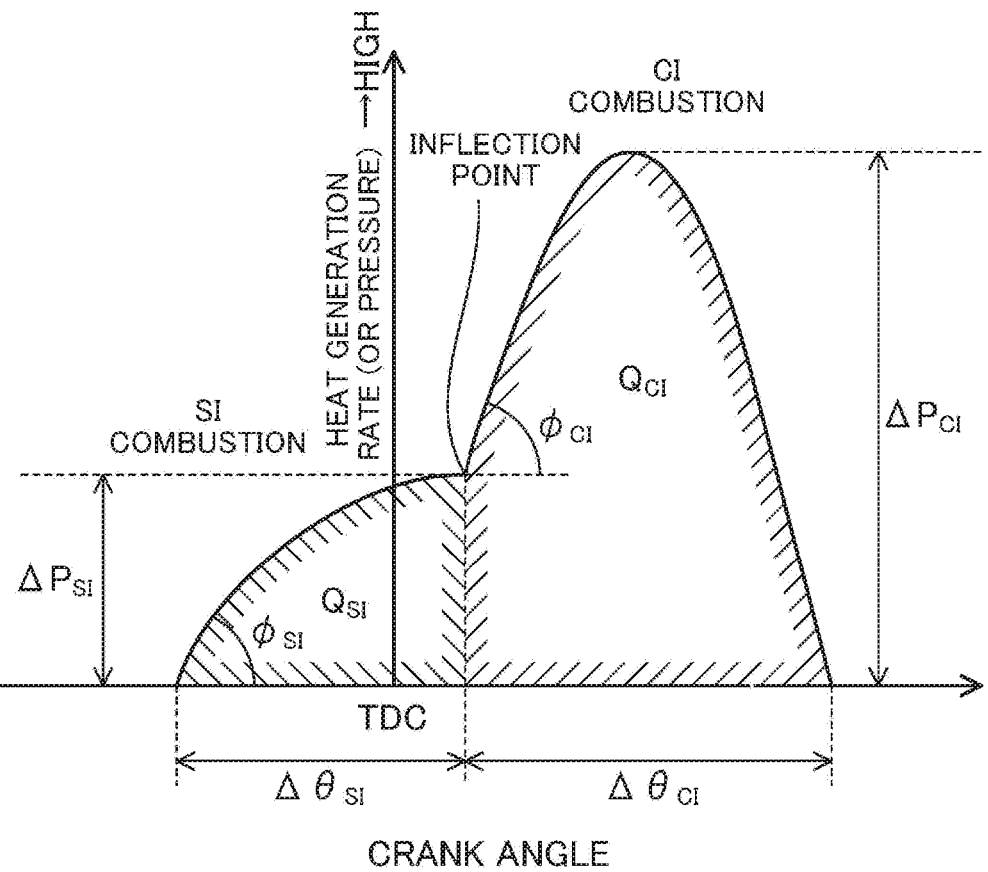
FIG. 6 illustrates definition of an SI rate in SPCCI combustion
Figure 7:
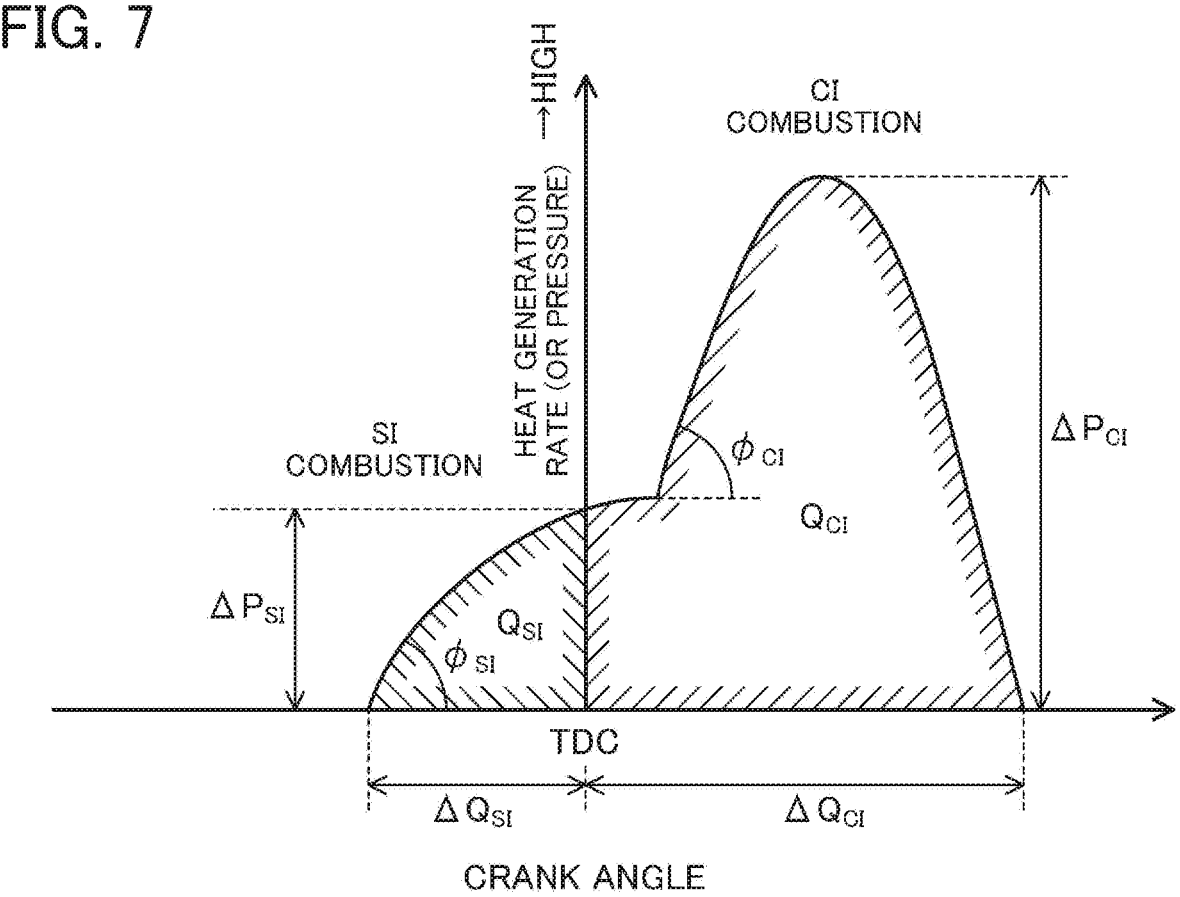
FIG. 7 illustrates another definition of an SI rate in SPCCI combustion.

Furthermore, in the SPCCI combustion, a waveform of the heat generation rate has an inflection point at timing when the CI combustion starts. As shown in FIG. 6, the inflection point in the waveform of the heat generation rate is set as a boundary, and a range on the advance side relative to the boundary may be defined as the SI combustion, and a range on the retard side relative to the boundary may be defined as the CI combustion. In this case, the SI rate may be represented as SI rate=$Q_{SI}/(Q_{SI}+Q_{CI})$ or SI rate=$Q_{SI}/Q_{CI}$ based on an area $Q_{SI}$ of the range on the advance side relative to the boundary and an area $Q_{CI}$ of the range on the retard side relative to the boundary, as indicated by hatching in FIG. 6. Furthermore, the SI rate may be defined based on not the entirety but a part of the area of the range on the advance side relative to the boundary, and a part of the area of the range on the retard side relative to the boundary.

Furthermore, the SI rate may not be defined based on heat generation. The SI rate may be represented as SI rate=$\Delta\theta_{SI}/(\Delta\theta_{SI}+\Delta\theta_{CI})$ or SI rate=$\Delta\theta_{SI}/\Delta\theta_{CI}$ based on a crank angle $\Delta\theta_{SI}$ for the range on the advance side relative to the boundary and a crank angle $\Delta\theta_{CI}$ for the range on the retard side relative to the boundary.

Moreover, SI rate=$\Delta P_{SI}/(\Delta P_{SI}+\Delta P_{CI})$ or SI rate=$\Delta P_{SI}/\Delta P_{CI}$ may be defined based on a peak $\Delta P_{SI}$ of the heat generation rate in the range on the advance side relative to the boundary and a peak $\Delta P_{CI}$ of the heat generation rate in the range on the retard side relative to the boundary.

In addition, SI rate=$\varphi_{SI}/(\varphi_{SI}+\varphi_{CI})$ or SI rate=$\varphi_{SI}/\varphi_{CI}$ may be defined based on a slope $\varphi_{SI}$ of the heat generation rate in the range on the advance side relative to the boundary and a slope $\varphi_{CI}$ of the heat generation rate in the range on the retard side relative to the boundary.

In the description herein, the SI rate is defined, based on the waveform of the heat generation rate, from an area (that is, magnitude of an amount of generated heat), the length of the horizontal axis (that is, magnitude of crank angle), the length of the vertical axis (that is, magnitude of heat generation rate), or a slope (that is, change rate of heat generation rate). The SI rate may be defined based on a waveform of a pressure (P) in the combustion chamber 17, similarly from the area, the length of the horizontal axis, the length of the vertical axis, or the slope, which is not shown.

Furthermore, in the SPCCI combustion, the inflection point of the combustion waveform associated with the heat generation rate or pressure may not always appear clearly. The SI rate which is not based on the inflection point may be defined as follows. That is, in the lower diagram in FIG. 8, as indicated by reference numeral 803, in the combustion waveform, a range on the advance side relative to the compression top dead center (TDC) may be defined as the SI combustion, and a range on the retard side relative to the compression top dead center may be defined as the CI combustion. Based thereon, similarly as described above, the SI rate may be defined from the area ($Q_{SI}$, $Q_{CI}$), the length of the horizontal axis ($\Delta\theta_{SI}$, $\Delta\theta_{CI}$), the length of the vertical axis ($\Delta P_{SI}$, $\Delta P_{CI}$), or the slope ($\varphi_{SI}$, $\varphi_{CI}$).

Furthermore, the SI rate may be defined based on not a combustion waveform actually obtained in the combustion chamber 17 but an amount of fuel. As described below, in the intermediate load region in which the SPCCI combustion is performed, divided injection that includes preceding injection and succeeding injection is performed. Fuel injected into the combustion chamber 17 by the succeeding injection does not diffuse in the combustion chamber 17 and is positioned near the spark plug 25 since a time from the injection to ignition is short. Therefore, the fuel injected into the combustion chamber 17 by the succeeding injection is combusted mainly by the SI combustion. Meanwhile, fuel injected into the combustion chamber 17 by the preceding injection is combusted mainly by CI combustion. Therefore, the SI rate can be defined based on an amount of fuel ($m_1$)

injected by the preceding injection, and an amount of fuel ($m_2$) injected by the succeeding injection. That is, SI rate=$m_2/(m_1+m_2)$ may be defined or SI rate=$m_2/m_1$ may be defined.

(Operation Control of Engine)

The engine 1 switches between the SI combustion and the SPCCI combustion according to the operation state, as described above. The engine 1 also changes the SI rate according to the operation state of the engine 1. Since the operation region where combustion by compression autoignition is performed is expanded, the engine 1 achieves both inhibition of generation of combustion noise and improvement of fuel economy.

Figure 8:
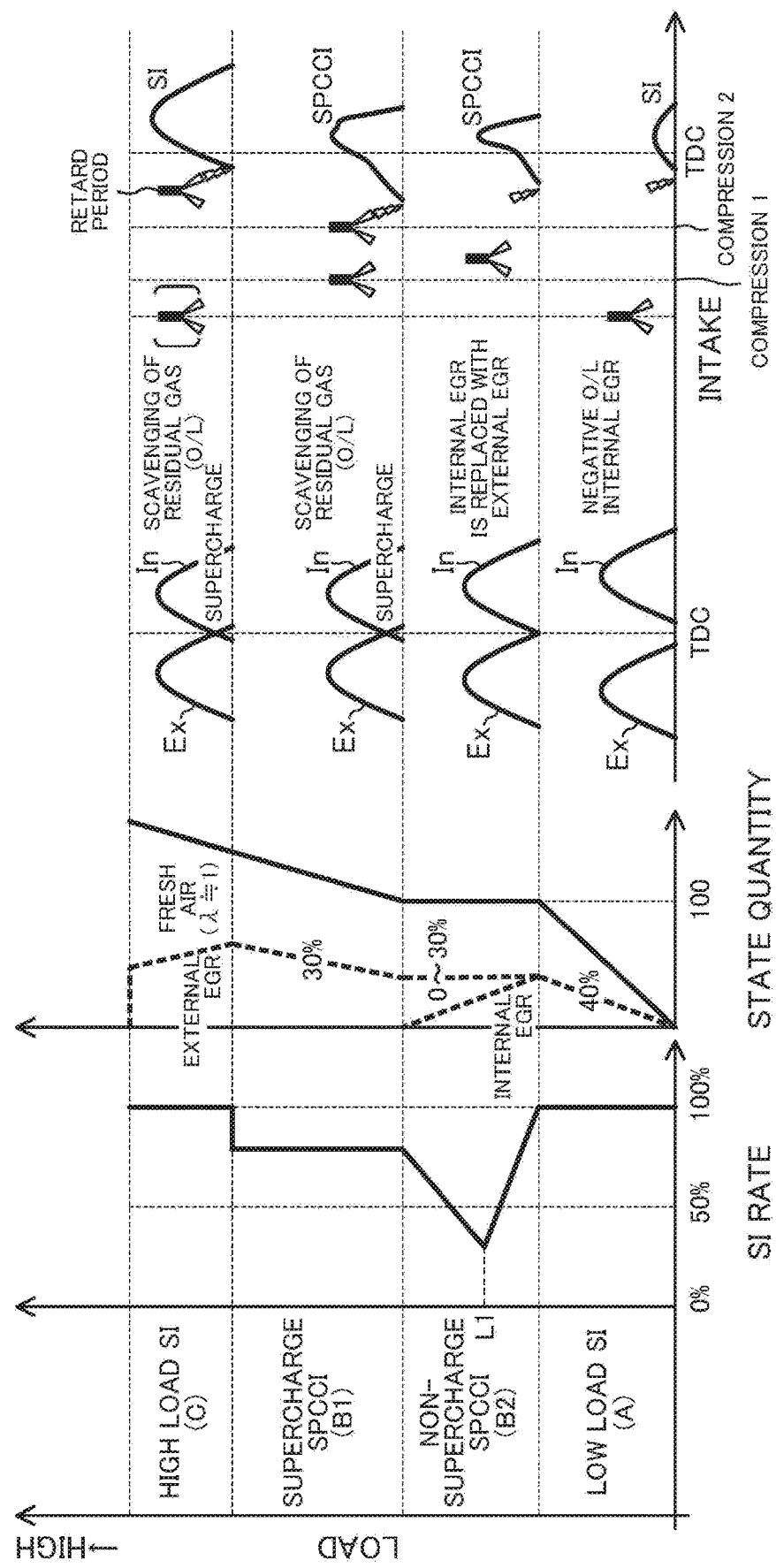
FIG. 8 illustrates change of an SI rate, change of a state quantity in the combustion chamber, change of an overlap period of an intake valve and an exhaust valve, and changes of fuel injection timing and ignition timing, according to whether load on the engine is high or low.

FIG. 8 illustrates change of the SI rate, change of a state quantity in the combustion chamber 17, change of an opening period of the intake valve and an opening period of the exhaust valve, and change of fuel injection timing and ignition timing, according to whether the load on the engine 1 is high or low. Hereinafter, operation control of the engine 1 will be described on the assumption that load on the engine 1 is gradually enhanced at a predetermined number of revolutions.

(Low Load Region (Low Load SI Combustion))

In the low load region (A), the engine 1 performs low load SI combustion. When the operation state of the engine 1 is in the low load region, the SI rate is constantly 100%.

In the low load region, as described above, the G/F of air-fuel mixture is made constant between 18.5 and 30. In the engine 1, fresh air and burned gas are introduced, in amounts corresponding to an amount of fuel, into the combustion chamber 17. An amount of fresh air to be introduced is adjusted by throttling and/or Miller cycle as described above. Since a dilution rate is high, the temperature in the combustion chamber 17 is enhanced in order to stabilize SI combustion. In the engine 1 in the low load region, internal EGR gas is introduced into the combustion chamber 17.

The internal EGR gas is introduced into the combustion chamber 17 (that is, burned gas is confined in the combustion chamber 17) by setting a negative overlap period in which the intake valve 21 and the exhaust valve 22 are both closed around the exhaust top dead center. The length of the negative overlap period is set as appropriate by an opening time of the intake valve 21 being adjusted by the intake electric S-VT 23, and an opening time of the exhaust valve 22 being adjusted by the exhaust electric S-VT 24, whereby an amount of the internal EGR gas is adjusted.

In the low load region, an amount for filling the combustion chamber 17 is adjusted to be less than 100%. As an amount of fuel is increased, an amount of fresh air and an amount of the internal EGR gas which are to be introduced into the combustion chamber 17 are gradually increased. The EGR ratio (that is, a mass ratio of EGR gas to the total gas in the combustion chamber 17) in the low load region is, for example, 40%.

The injector 6 injects fuel into the combustion chamber 17 in the intake stroke. In the combustion chamber 17, homogeneous air-fuel mixture having the excess air ratio λ of 1.0±0.2 and the G/F of 18.5 to 30 is formed. The excess air ratio λ is preferably 1.0 to 1.2. At predetermined timing before the compression top dead center, the spark plug 25 ignites the air-fuel mixture, whereby the air-fuel mixture is combusted by flame propagation without causing autoignition.

(Second Intermediate Load Region (Non-Supercharge SPCCI Combustion))

When load on the engine 1 becomes high and the operation state enters the second intermediate load region (B2), the engine 1 switches from the low load SI combustion to non-supercharge SPCCI combustion. The SI rate is less than 100%. An amount of fuel is increased according to load on the engine 1 being increased. In the second intermediate load region, when the load is low, the proportion of CI combustion is increased according to an amount of fuel being increased. The SI rate is gradually reduced according to load on the engine 1 being increased. The SI rate is reduced to a predetermined value (lowest value) that is 50% or less, in the example shown in FIG. 9.

Since an amount of fuel is increased, a temperature of combustion becomes high in the second intermediate load region. When the temperature in the combustion chamber 17 is excessively high, heat generation at the start of CI combustion is intense. In this case, combustion noise is increased.

Therefore, in the second intermediate load region, a ratio between the internal EGR gas and the external EGR gas is changed with respect to change of load on the engine 1 in order to adjust a temperature in the combustion chamber 17 before start of compression. That is, according to load on the engine 1 being increased, hot internal EGR gas is gradually reduced, and cooled external EGR gas is gradually increased. The negative overlap period is changed from the maximum to zero as the load is increased in the second intermediate load region. The internal EGR gas becomes zero when the load is highest in the second intermediate load region.

An opening degree of the EGR valve 54 is changed in the second intermediate load region such that the external EGR gas is increased as the load is increased. An amount of the external EGR gas to be introduced into the combustion chamber 17 is adjusted so as to be, for example, 0 to 30% when represented as the EGR ratio. In the second intermediate load region, the EGR gas is replaced such that the internal EGR gas is replaced with the external EGR gas according to load on the engine 1 being increased.

An amount of EGR gas to be introduced into the combustion chamber 17 is sequential between the low load region and the second intermediate load region. In a region, of the second intermediate load region, in which load is low, similarly to the low load region, a large amount of internal EGR gas is introduced into the combustion chamber 17. Since the temperature in the combustion chamber 17 becomes high, when load on the engine 1 is low, autoignition of air-fuel mixture assuredly occurs. In a region, of the second intermediate load region, in which load is high, external EGR gas is introduced into the combustion chamber 17. Since the temperature in the combustion chamber 17 becomes low, when load on the engine 1 is high, combustion noise caused by CI combustion can be reduced.

In the second intermediate load region, an amount for filling the combustion chamber 17 is 100%. The opening degree of the throttle valve 43 is a fully opened degree. An amount of EGR gas which is the sum of internal EGR gas and external EGR gas is adjusted, whereby an amount of fresh air to be introduced into the combustion chamber 17 is adjusted so as to correspond to an amount of fuel.

In non-supercharge SPCCI combustion, as the proportion of the CI combustion is increased, timing of autoignition is advanced. If the timing of autoignition is earlier than the compression top dead center, heat generation at the start of CI combustion is intense. In this case, combustion noise is increased. Therefore, when load on the engine 1 reaches a predetermined load L1, the engine 1 gradually increases the SI rate according to load on the engine 1 being increased.

That is, as an amount of fuel is increased, the engine 1 increases the proportion of SI combustion. Specifically, as shown in the upper diagram of FIG. 10, in non-supercharge SPCCI combustion, as an amount of fuel is increased, ignition timing is gradually advanced. As described above, an amount of internal EGR gas to be introduced is reduced and an amount of external EGR gas to be introduced is increased, whereby the temperature in the combustion chamber 17 is adjusted. Therefore, even if the SI rate is increased according to an amount of fuel being increased, enhancement in temperature at the compression top dead center can be inhibited. Change of the slope of the heat generation rate in the SI combustion is little even if load is increased. When the ignition timing is advanced, an amount of heat generated by the SI combustion is increased according to start of the SI combustion becoming earlier.

As a result of enhancement in temperature in the combustion chamber 17 by the SI combustion being inhibited, autoignition of unburned air-fuel mixture occurs at timing at or after the compression top dead center. Since an amount of heat generated by the SI combustion is increased, heat generation in the CI combustion is almost the same even if load on the engine 1 is increased. Therefore, the SI rate is set to be gradually increased according to load on the engine 1 being increased, whereby increase of combustion noise can be avoided. The higher load is, the more greatly the center of gravity of combustion in non-supercharge SPCCI combustion is retarded.

In the second intermediate load region, the injector 6 injects fuel into the combustion chamber 17 in two parts as preceding injection and succeeding injection in the compression stroke. In the preceding injection, fuel is injected at timing that is not close to the ignition timing. In the succeeding injection, fuel is injected at timing close to the ignition timing. In the combustion chamber 17, almost homogeneous air-fuel mixture having the excess air ratio $\lambda$ of $1.0\pm0.2$ and the G/F of 18.5 to 30 is formed. Since the air-fuel mixture is almost homogeneous, improvement of fuel economy by reducing unburned fuel loss and improvement of exhaust gas performance by avoiding generation of smoke, can be achieved. The excess air ratio k is preferably 1.0 to 1.2.

At predetermined timing before the compression top dead center, the spark plug 25 ignites air-fuel mixture, whereby the air-fuel mixture is combusted by flame propagation. Thereafter, autoignition of the unburned air-fuel mixture occurs, to cause CI combustion. The fuel injected in the succeeding injection is subjected mainly to SI combustion. The fuel injected in the preceding injection is subjected mainly to CI combustion. Since the preceding injection is performed in the compression stroke, abnormal combustion such as preignition can be prevented from being caused by the fuel injected in the preceding injection. Furthermore, fuel injected in the succeeding injection can be stably combusted by flame propagation.

(First Intermediate Load Region (Supercharge SPCCI Combustion))

When load on the engine 1 is further increased and the operation state of the engine 1 thus enters the first intermediate load region (B1), the supercharger 44 performs supercharging with fresh air and external EGR gas. An amount of fresh air and an amount of external EGR gas, which are to be introduced into the combustion chamber 17, are both increased according to load on the engine 1 being increased. An amount of the external EGR gas to be introduced into the combustion chamber 17 is, for example, 30% when represented as the EGR ratio. The EGR ratio is almost constant regardless of whether load on the engine 1 is high or low. Therefore, the G/F of air-fuel mixture is also almost constant regardless of whether load on the engine 1 is high or low. An amount of EGR gas to be introduced into the combustion chamber 17 is sequential between the second intermediate load region and the first intermediate load region.

The SI rate indicates a predetermined value that is less than 100%, and is made constant regardless of whether the load on the engine 1 is high or low. When the SI rate in the second intermediate load region, particularly, the SI rate for which load is higher than the predetermined load L1, and which is gradually increased according to load on the engine 1 being increased, is compared with the SI rate in the first intermediate load region, the SI rate in the first intermediate load region in which load on the engine 1 is higher, is greater than the SI rate in the second intermediate load region. The SI rate is sequential at a boundary between the first intermediate load region and the second intermediate load region.

Figure 9:
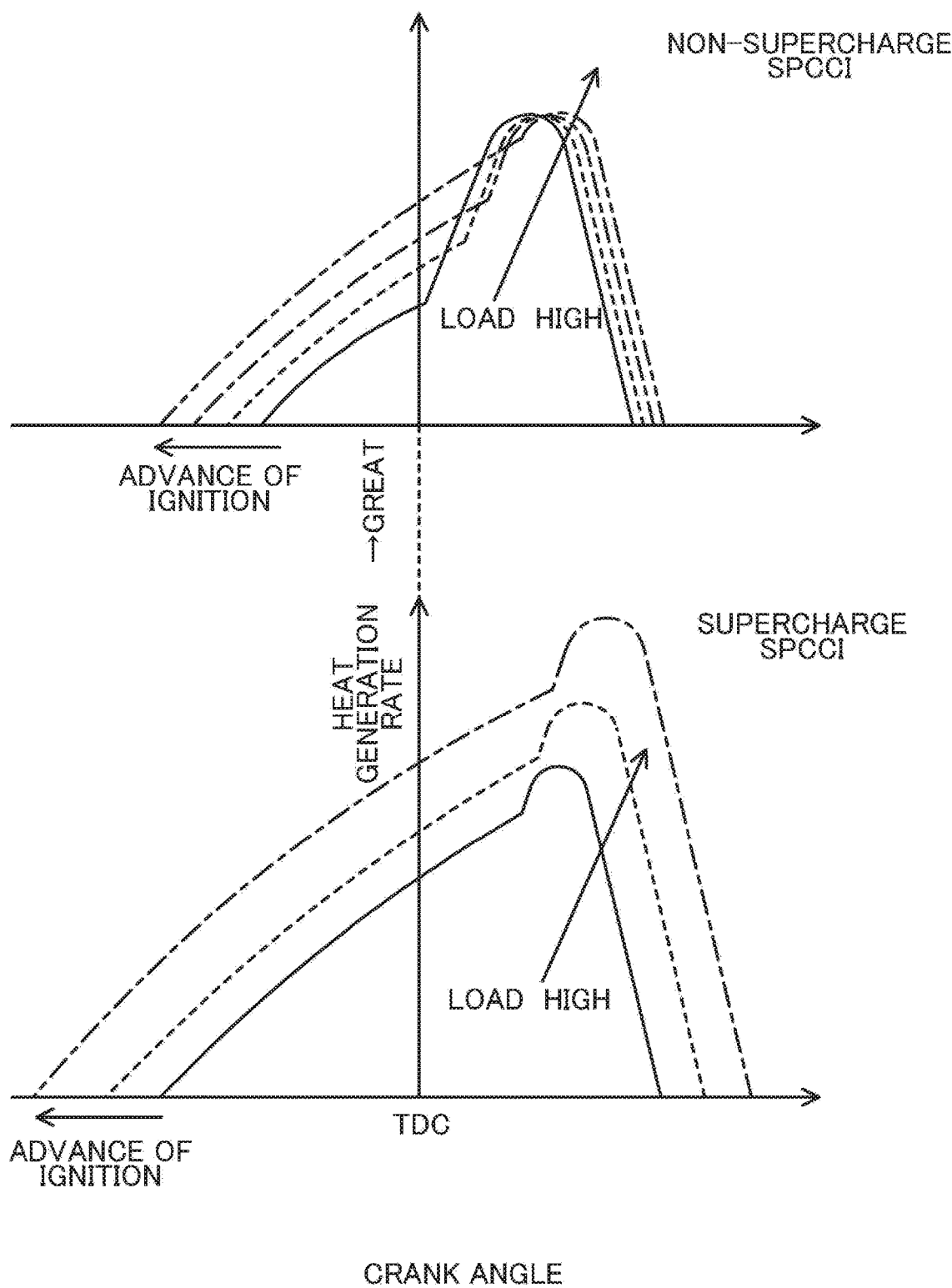
FIG. 9 illustrates, in the upper diagram, change of a combustion waveform with respect to increase of load on the engine in non-supercharge SPCCI combustion, and illustrates, in the lower diagram, change of a combustion waveform with respect to increase of load on the engine in supercharge SPCCI combustion.

As shown in the lower diagram of FIG. 9, also in supercharge SPCCI combustion, the ignition timing is gradually advanced according to an amount of fuel being increased. As described above, an amount of fresh air and an amount of EGR gas, which are to be introduced into the combustion chamber 17, are increased by supercharging, whereby heat capacity is high. Even when an amount of fuel is increased, enhancement in temperature in the combustion chamber due to SI combustion can be inhibited. A waveform of the heat generation rate in supercharge SPCCI combustion is enlarged in similar shapes according to load being increased.

That is, an amount of heat generated by SI combustion is increased with little change of the slope of the heat generation rate in the SI combustion. At almost the same timing at or after the compression top dead center, autoignition of unburned air-fuel mixture occurs. An amount of heat generated by CI combustion is increased when load on the engine 1 becomes high. As a result, in the first intermediate load region, both an amount of heat generated by the SI combustion and an amount of heat generated by the CI combustion are increased, whereby the SI rate is constant regardless of whether load on the engine 1 is high or low. When a peak of heat generation in the CI combustion is enhanced, combustion noise is increased. However, in the first intermediate load region, since load on the engine 1 is relatively high, combustion noise can be allowed to a certain degree. The higher load is, the more greatly the center of gravity of combustion in supercharge SPCCI combustion is retarded.

In the first intermediate load region, an overlap period in which both the intake valve 21 and the exhaust valve 22 are opened is set around the exhaust top dead center. Burned gas in the combustion chamber 17 is scavenged by supercharging. Thus, since the temperature in the combustion chamber 17 becomes low, abnormal combustion can be inhibited from occurring when load on the engine 1 is relatively high. Furthermore, by the temperature in the combustion chamber 17 being lowered, timing of autoignition can be made appropriate in a region in which load on the engine 1 is relatively high, and the SI rate can be maintained as a predetermined SI rate. Furthermore, by scavenging burned gas, an amount of fresh air to be filled in the combustion chamber 17 can be increased.

In the first intermediate load region, similarly to the second intermediate load region, the injector 6 injects fuel into the combustion chamber 17 in two parts as preceding injection and succeeding injection in the compression stroke. In the preceding injection, fuel is injected at timing which is not close to the ignition timing. In the succeeding injection, fuel is injected at timing close to the ignition timing. In the combustion chamber 17, almost homogeneous air-fuel mixture having the excess air ratio λ of 1.0±0.2 and the G/F of 18.5 to 30 is formed. Since the air-fuel mixture is almost homogeneous, improvement of fuel economy by reducing unburned fuel loss and improvement of exhaust gas performance by avoiding generation of smoke, can be achieved. The excess air ratio λ is preferably 1.0 to 1.2.

At predetermined timing before the compression top dead center, the spark plug 25 ignites air-fuel mixture, whereby the air-fuel mixture is combusted by flame propagation. Thereafter, autoignition of unburned air-fuel mixture occurs, to cause CI combustion. Fuel injected in the succeeding injection is subjected mainly to SI combustion. Fuel injected in the preceding injection is subjected mainly to CI combustion. Since the preceding injection is performed in the compression stroke, abnormal combustion such as preignition can be prevented from being caused by fuel injected in the preceding injection. Furthermore, fuel injected in the succeeding injection can be stably combusted by flame propagation.

(High Load Region (High Load SI Combustion))

When load on the engine 1 is further increased and the operation state of the engine 1 enters the high load region (C), the engine 1 performs high load SI combustion. Therefore, the SI rate in the high load region is 100%.

The throttle valve 43 is fully opened. The supercharger 44 performs supercharging with fresh air and external EGR gas also in the high load region. The opening degree of the EGR valve 54 is adjusted, whereby an amount of external EGR gas to be introduced is gradually reduced according to load on the engine 1 being increased. Thus, fresh air to be introduced into the combustion chamber 17 is increased when load on the engine 1 becomes high. When an amount of fresh air is increased, an amount of fuel can be increased. Therefore, the maximum output of the engine 1 is advantageously enhanced. An amount of EGR gas to be introduced into the combustion chamber 17 is sequential between the first intermediate load region and the high load region.

Also in the high load region, similarly to the first intermediate load region, an overlap period in which both the intake valve 21 and the exhaust valve 22 are opened is set around the exhaust top dead center. Burned gas in the combustion chamber 17 is scavenged by supercharging. Thus, occurrence of abnormal combustion is inhibited. Furthermore, an amount of fresh air to be filled in the combustion chamber 17 can be increased.

In a region (that is, the first high load region (C1)) on the low rotation side of the high load region, the injector 6 injects fuel into the combustion chamber 17 in the retard period as described above. In a region (that is, the second high load region (C2)) on the high rotation side of the high load region, the injector 6 injects fuel into the combustion chamber 17 in the intake stroke. In either case, almost homogeneous air-fuel mixture having the excess air ratio λ of 1.0±0.2 and the G/F of 18.5 to 30 is formed in the combustion chamber 17. At the highest load, the excess air ratio λ is, for example, 0.8. Furthermore, the G/F of air-fuel mixture may be, for example, 17 at the highest load. At predetermined timing before the compression top dead center, the spark plug 25 ignites air-fuel mixture, whereby the air-fuel mixture is combusted by flame propagation. In the high load region, SI combustion of the air-fuel mixture occurs by high-pressure retard injection or fuel injection in the intake stroke without causing autoignition.

(Adjustment of SI Rate)

Figure 10:
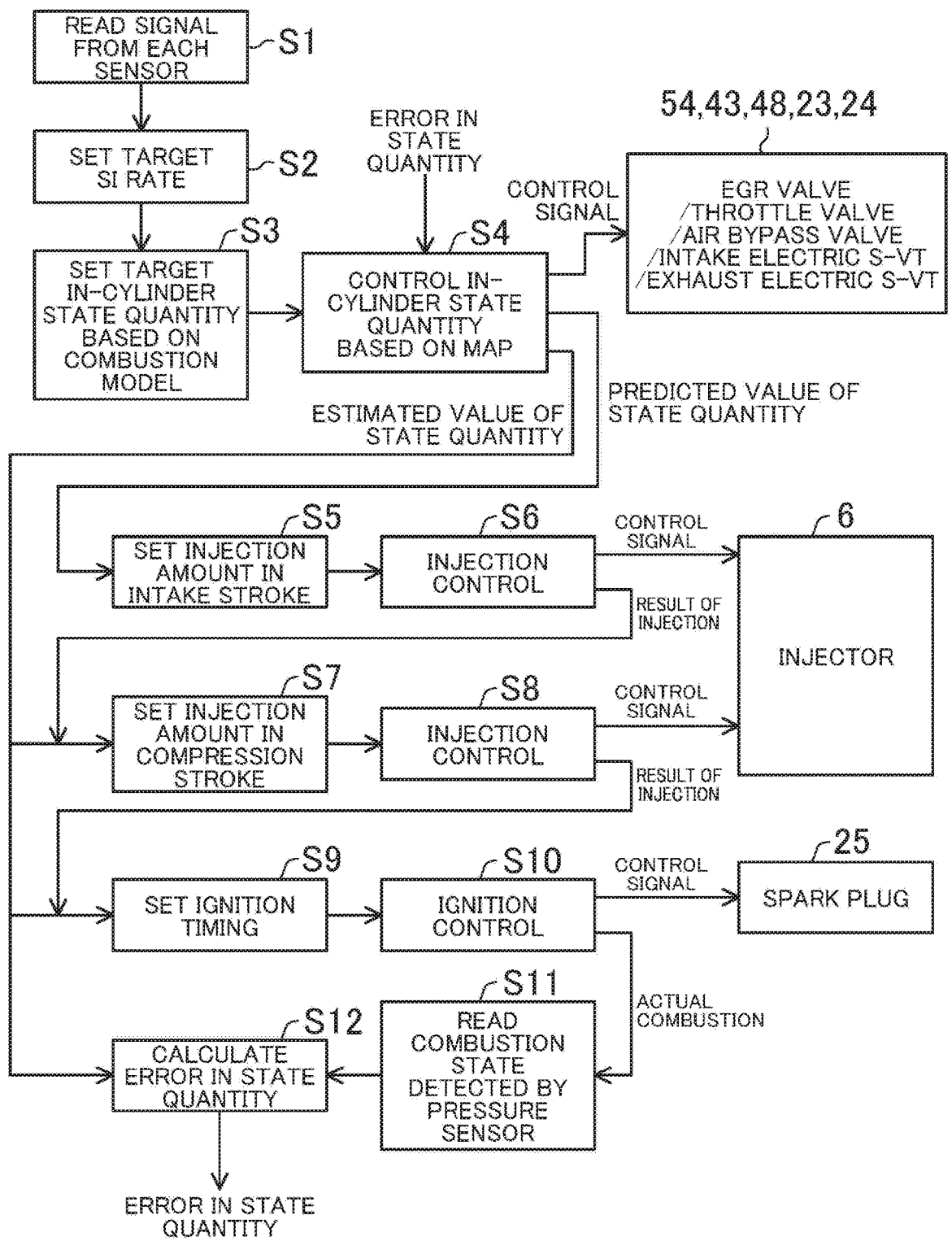
FIG. 10 is a flow chart showing a procedure of control, of the engine, performed by an ECU.

FIG. 10 shows a flow of operation control, of the engine, performed by the ECU 10. The ECU 10 determines an operation state of the engine 1 based on the detection signals from the sensors SW1 to SW16, and adjusts a state quantity in the combustion chamber 17, adjusts an injection amount, adjusts injection timing, and adjusts ignition timing such that combustion in the combustion chamber 17 becomes combustion at an SI rate corresponding to the operation state. The ECU 10 also adjusts the SI rate when determining that the SI rate needs to be adjusted, based on detection signals from the sensors.

The ECU firstly reads detection signals from the sensors SW1 to SW16 in step S1. Subsequently, the ECU 10 determines an operation state of the engine 1 based on the detection signals, and sets a target SI rate in step S2. The target SI rate is as shown in FIG. 8.

In subsequent step S3, the ECU 10 sets a target in-cylinder state quantity for obtaining the target SI rate having been set, based on a preset combustion model. Specifically, a target temperature, a target pressure, and a target state quantity in the combustion chamber 17 are set. In step S4, the ECU 10 sets an opening degree of the EGR valve 54, an opening degree of the throttle valve 43, an opening degree of the air bypass valve 48, and phase angles of the intake electric S-VT 23 and the exhaust electric S-VT 24, which are necessary for obtaining the target in-cylinder state quantity. The ECU 10 presets control amounts for these devices, and sets the control amounts based on a map stored in the ECU 10. The ECU 10 outputs control signals to the EGR valve 54, the throttle valve 43, the air bypass valve 48, and the intake electric S-VT 23 and the exhaust electric S-VT 24, based on the set control amounts. Each device operates based on the control signal from the ECU 10, whereby the state quantity in the combustion chamber 17 becomes the target state quantity.

The ECU 10 further calculates a predicted value and an estimated value of the state quantity in the combustion chamber 17, based on the set control amount for each device. The predicted value of the state quantity is a value obtained by predicting a state quantity, in the combustion chamber 17, before closing of the intake valve 21, and is used for setting an amount of fuel injected in the intake stroke as described below. The estimated value of the state quantity is a value obtained by estimating a state quantity, in the combustion chamber 17, after closing of the intake valve 21, and is used for setting an amount of fuel injected in the compression stroke and setting ignition timing as described below. The estimated value of the state quantity is also used for calculating an error in state quantity based on comparison with an actual combustion state as described below.

The ECU 10 sets, in step S5, an amount of fuel to be injected in the intake stroke based on the predicted value of the state quantity. When fuel is not injected in the intake stroke, the amount of injected fuel is zero. In step S6, the ECU 10 controls injection by the injector 6. That is, a control signal is outputted to the injector 6 such that fuel is injected into the combustion chamber 17 at predetermined injection timing.

In step S7, the ECU 10 sets an amount of fuel to be injected in the compression stroke based on the estimated value of the state quantity and a result of injection of fuel in the intake stroke. When fuel is not injected in the compression stroke, the amount of injected fuel is zero. When divided injection is performed in the compression stroke, each of an amount of injection in the preceding injection and an amount of injection in the succeeding injection is set. In step S8, the ECU 10 outputs a control signal to the injector 6 such that fuel is injected into the combustion chamber 17 at injection timing based on the preset map.

In step S9, the ECU 10 sets ignition timing based on the estimated value of the state quantity and a result of injection of fuel in the compression stroke. In step S10, the ECU 10 outputs a control signal to the spark plug 25 such that air-fuel mixture in the combustion chamber 17 is ignited at the set ignition timing.

The spark plug 25 ignites the air-fuel mixture, to cause SI combustion or SPCCI combustion in the combustion chamber 17. In step S11, the ECU 10 reads change of pressure, in the combustion chamber 17, detected by the pressure sensor SW6, and determines, based thereon, a combustion state of the air-fuel mixture in the combustion chamber 17. Furthermore, in step S12, the ECU 10 compares a result of detection of the combustion state with the estimated value of the state quantity, which is estimated in step S4, and calculates an error between the estimated value of the state quantity and an actual state quantity. The calculated error is used for estimation in step S4 in cycles subsequent to this cycle. The ECU 10 adjusts opening degrees of the throttle valve 43, the EGR valve 54, and/or the air bypass valve 48, and phase angles of the intake electric S-VT 23 and the exhaust electric S-VT 24 so as to remove the error in the state quantity. Thus, amounts of fresh air and EGR gas to be introduced into the combustion chamber 17 are adjusted. Feedback of the error in the state quantity corresponds to adjustment of an SI rate performed by the ECU 10 when adjustment of the SI rate is determined to be necessary based on the error between the target SI rate and the actual SI rate.

Furthermore, in step S8, injection timing in the compression stroke is advanced so as to be earlier than injection timing based on the map, by the ECU 10, such that ignition timing can be advanced, when the ECU 10 makes prediction that the temperature in the combustion chamber 17 is lower than the target temperature based on the estimated value of the state quantity. Meanwhile, in step S7, the ECU 10 retards injection timing in the compression stroke from injection timing based on the map such that ignition timing can be retarded when the ECU 10 makes prediction that the temperature in the combustion chamber 17 is higher than the target temperature based on the estimated value of the state quantity.

Figure 11:
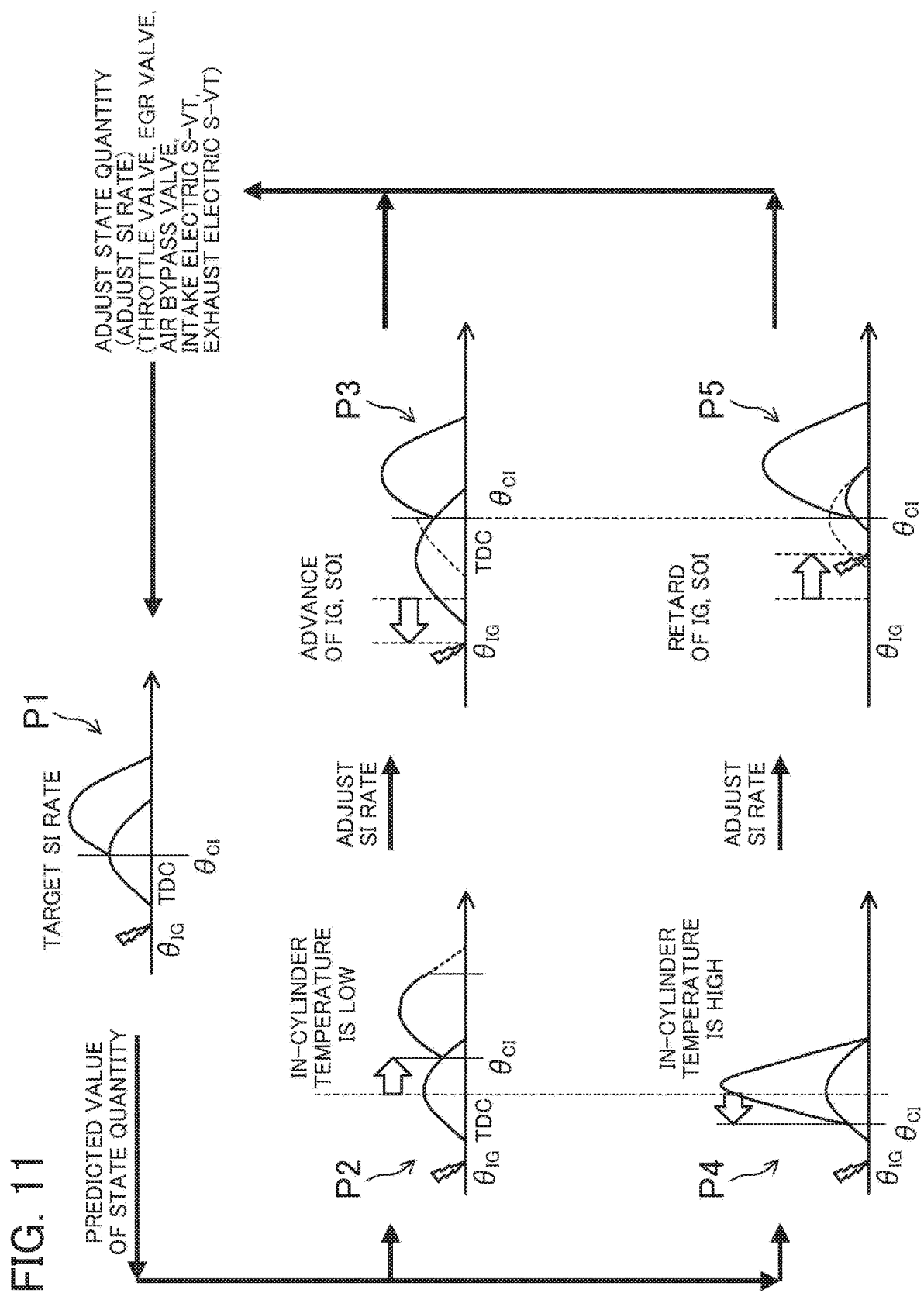
FIG. 11 conceptually illustrates control of adjustment of an SI rate.

That is, as indicated by P2 in FIG. 11, when the temperature in the combustion chamber 17 is low, after SI combustion by spark ignition starts, timing $\theta_{CI}$ at which autoignition of unburned air-fuel mixture occurs delays, and the SI rate is deviated from the target SI rate (see P1). In this case, unburned fuel is increased or exhaust gas performance is degraded.

Therefore, when the ECU 10 makes prediction that the temperature in the combustion chamber 17 is lower than the target temperature, the ECU 10 advances the injection timing and also advances the ignition timing $\theta_{IG}$ in step S10 shown in FIG. 10. As indicated by P3 in FIG. 11, the start of SI combustion becomes earlier, whereby sufficient heat generation by the SI combustion can be caused. Therefore, when the temperature in the combustion chamber 17 is low, the timing $\theta_{CI}$ of autoignition of unburned air-fuel mixture can be prevented from being delayed. As a result, the SI rate approaches the target SI rate. Increase of unburned fuel or degradation of exhaust gas performance is prevented.

Furthermore, as indicated by P4 in FIG. 11, when the temperature in the combustion chamber 17 is high, autoignition of unburned air-fuel mixture occurs immediately after the SI combustion by spark ignition starts, and the SI rate is deviated from the target SI rate (see P1). In this case, combustion noise is increased.

Therefore, when the ECU 10 makes prediction that the temperature in the combustion chamber 17 is higher than the target temperature, the ECU 10 retards the injection timing and also retards the ignition timing $\theta_{IG}$ in step S10 shown in FIG. 10. As indicated by P5 in FIG. 11, since start of the SI combustion is delayed, when the temperature in the combustion chamber 17 is high, the timing $\theta_{CI}$ of autoignition of unburned air-fuel mixture can be prevented from being earlier. As a result, the SI rate approaches the target SI rate. Increase of combustion noise is prevented.

These adjustments of the injection timing and the ignition timing correspond to adjustment of the SI rate performed by the ECU 10 when adjustment of the SI rate in the SPCCI combustion is determined to be necessary. By adjusting the injection timing, an appropriate air-fuel mixture can be formed in the combustion chamber 17 at the advanced or retarded ignition timing. The spark plug 25 can assuredly ignite the air-fuel mixture, and autoignition of unburned air-fuel mixture can be also performed at appropriate timing.

In FIG. 11, adjustment of the state quantity in the combustion chamber 17 by controlling the throttle valve 43, the EGR valve 54, the air bypass valve 48, the intake electric S-VT 23, and the exhaust electric S-VT 24 based on an actual combustion state is as described for step S12 and step S4 in FIG. 10.

The engine 1 adjusts the SI rate by means of the state quantity setting device that includes the throttle valve 43, the EGR valve 54, the air bypass valve 48, the intake electric S-VT 23, and the exhaust electric S-VT 24. By adjusting the state quantity in the combustion chamber 17, the SI rate can be roughly adjusted. In addition thereto, the engine 1 adjusts the fuel injection timing and the ignition timing, to adjust the SI rate. By adjusting the injection timing and the ignition timing, for example, correction of difference between the cylinders can be performed, and slight adjustment of the autoignition timing can be performed. By adjusting the SI rate at two stages, the engine 1 can accurately perform the target SPCCI combustion corresponding to the operation state.

The control of the engine 1 by the ECU 10 is not limited to control based on the combustion model described above.

The technique disclosed here is not limited to application to the engine 1 having the above-described configuration. Various configurations can be adopted as the configuration of the engine 1.

DESCRIPTION OF REFERENCE CHARACTERS

1 Engine
10 ECU (Controller)
17 Combustion Chamber
23 Intake Electric S-VT (State Quantity Setting Device, Variable Valve Mechanism)
24 Exhaust Electric S-VT (State Quantity Setting Device, Variable Valve Mechanism)
25 Spark Plug
49 Supercharging System (State Quantity Setting Device)
44 Supercharger
43 Throttle Valve (State Quantity Setting Device)
48 Air Bypass Valve (State Quantity Setting Device)
54 EGR Valve (State Quantity Setting Device)
55 EGR System (State Quantity Setting Device)
6 Injector SW1 air flow sensor
SW2 first intake air temperature sensor
SW3 first pressure sensor
SW4 second intake air temperature sensor
SW5 second pressure sensor
SW6 pressure sensor
SW7 exhaust air temperature sensor
SW8 linear $O_2$ sensor
SW9 lambda $O_2$ sensor
SW10 water temperature sensor
SW11 crank angle sensor
SW12 accelerator opening degree sensor
SW13 intake cam angle sensor
SW14 exhaust cam angle sensor
SW15 EGR differential pressure sensor
SW16 fuel pressure sensor

The invention claimed is:

1. A control apparatus for a compression autoignition engine, the control apparatus comprising:
   an engine configured to cause autoignition of air-fuel mixture in a combustion chamber;
   a spark plug disposed so as to face an inside of the combustion chamber, the spark plug being configured to ignite the air-fuel mixture in the combustion chamber;
   a controller connected to the spark plug, the controller being configured to operate the engine by outputting a control signal to the spark plug;
   a sensor connected to the controller, the sensor being configured to detect a parameter relating to an operation state of the engine, and output a detection signal to the controller, the sensor including a pressure sensor configured to detect a pressure inside the combustion chamber; and
   a state quantity setting device coupled to the engine, the state quantity setting device being configured to set the inside of the combustion chamber TO A TARGET state by adjusting an introduction of fresh air and an introduction of burned gas into the combustion chamber, wherein the state quantity setting device includes an intake valve to adjust the introduction of fresh air into the combustion chamber, and an external EGR valve to adjust the introduction of burned gas into the combustion chamber, wherein
   after the spark plug ignites the air-fuel mixture to start combustion, unburned air-fuel mixture is combusted by flame propagation and compression ignition,
   the controller changes an SI (Spark Ignition) rate in accordance with the operation state of the engine based on the detection signal from the sensor, the SI rate being an index associated with a ratio of an amount of heat generated when the air-fuel mixture in the combustion chamber is combusted by flame propagation, to a total amount of heat generated when the air-fuel mixture is combusted by flame propagation and compression ignition,
   the controller adjusts the SI rate when determining that the SI rate needs to be adjusted, upon receiving the detection signal from the sensor, and
   the controller is further configured to:
      read a change of pressure detected by the pressure sensor after the spark plug ignites the air-fuel mixture,
      determine a combustion state of the air-fuel mixture in the combustion chamber based on the change of pressure,
      calculate an error between a target state quantity and AN ESTIMATED state quantity which is estimated based on the combustion state, and
      adjust the state quantity setting device so as to remove the ERROR BETWEEN THE TARGET STATE QUANTITY AND THE ESTIMATED STATE QUANTITY.

2. The control apparatus for the compression autoignition engine of claim 1, further comprising:
   an injector mounted to the engine, the injector being configured to inject fuel into the combustion chamber.

3. The control apparatus for the compression autoignition engine of claim 2, wherein
   the controller sets a target SI rate based on the operation state of the engine, and outputs control signals to the state quantity setting device, the injector, and the spark plug so that combustion at the target SI rate is performed.

4. The control apparatus for the compression autoignition engine of claim 3, wherein
   the controller receives the detection signal from the pressure sensor, calculates the SI rate based on a pressure waveform caused by combustion of the air-fuel mixture, and adjusts the SI rate when the calculated SI rate deviates from the target SI rate.

5. The control apparatus for the compression autoignition engine of claim 4, wherein
   the controller adjusts the introduction of fresh air and burned gas into the combustion chamber by the control signal outputted to the state quantity setting device, so as to adjust the SI rate.

6. The control apparatus for the compression autoignition engine of claim 3, wherein
   the controller predicts a state quantity in the combustion chamber, based on the detection signal from the sensor, and
   when the controller determines, based on the predicted state quantity, that an SI rate of combustion to be performed will deviate from the target SI rate, the controller adjusts the SI rate so that the SI rate approaches the target SI rate.

7. The control apparatus for the compression autoignition engine of claim 6, wherein
   the controller adjusts ignition timing by the control signal outputted to the spark plug so that the SI rate approaches the target SI rate.

8. The control apparatus for the compression autoignition engine of claim 7, wherein
   the controller adjusts fuel injection timing by the control signal outputted to the injector so as to correspond to the adjustment of the ignition timing.

9. The control apparatus for the compression autoignition engine of claim 2, wherein
   the injector receives the control signal from the controller, and executes: succeeding injection in which fuel is injected at timing before ignition timing and close to the ignition timing; and preceding injection in which fuel is injected at timing before the succeeding injection and not close to the ignition timing, so as to form an almost homogeneous air-fuel mixture in the combustion chamber.

10. The control apparatus for the compression autoignition engine of claim 2, wherein
    the controller outputs control signals to the state quantity setting device and the injector, to set the inside of the combustion chamber in a state where a G/F that represents an index associated with a mass ratio between total gas in the combustion chamber, and fuel is in a range from 18.5 to 30, and an excess air ratio λ is 1.0±0.2.

11. The control apparatus for the compression autoignition engine of claim 1, wherein the controller is further configured to adjust at least one of the external EGR valve, an air bypass valve, phase angles of an intake electric valve, and phase angles of an exhaust electric valve so as to remove the error in the state quantity.

* * * * *